(12) United States Patent
Schlosser

(10) Patent No.: US 10,961,839 B2
(45) Date of Patent: Mar. 30, 2021

(54) DOWNHOLE EQUIPMENT TRANSPORT CONTROL

(71) Applicant: Schlumberger Technology Corporation, Sugar Land, TX (US)

(72) Inventor: David Schlosser, Fulshear, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 107 days.

(21) Appl. No.: 16/322,782

(22) PCT Filed: Aug. 1, 2017

(86) PCT No.: PCT/US2017/044774
§ 371 (c)(1),
(2) Date: Feb. 1, 2019

(87) PCT Pub. No.: WO2018/026744
PCT Pub. Date: Feb. 8, 2018

(65) Prior Publication Data
US 2019/0203575 A1    Jul. 4, 2019

Related U.S. Application Data

(60) Provisional application No. 62/370,111, filed on Aug. 2, 2016.

(51) Int. Cl.
*E21B 47/00* (2012.01)
*E21B 23/14* (2006.01)
(Continued)

(52) U.S. Cl.
CPC .............. *E21B 47/00* (2013.01); *B66D 1/505* (2013.01); *E21B 19/008* (2013.01); *E21B 23/08* (2013.01);
(Continued)

(58) Field of Classification Search
CPC ......... E21B 47/00; E21B 47/007; E21B 23/14
See application file for complete search history.

(56) References Cited

U.S. PATENT DOCUMENTS 6,634,436 B1    10/2003  Desai
2002/0124640 A1   9/2002  Brewer
(Continued)

FOREIGN PATENT DOCUMENTS

EP    0898046 A2    2/1999
WO   2014099723 A1   6/2014
(Continued)

OTHER PUBLICATIONS

International Preliminary Report on Patentability issued in the related PCT Application PCT/US2017/044774, dated Feb. 14, 2019 (12 pages).
(Continued)

*Primary Examiner* — Robert E Fuller
(74) *Attorney, Agent, or Firm* — Eileen Pape

(57) ABSTRACT

A method can include receiving information associated with a conveyance of equipment in a borehole via a cable. The method may further include determining cable tension values based at least in part on a model and at least a portion of the information and conveying the equipment in the borehole via the cable; acquiring a cable tension value via one or more sensors. The method may further include comparing the acquired cable tension value to at least one of the determined cable tension values and, based at least in part on the comparing, setting a cable tension limit for further conveying of the equipment in the borehole via the cable.

20 Claims, 18 Drawing Sheets

(51) Int. Cl.
  *E21B 23/08*   (2006.01)
  *B66D 1/50*    (2006.01)
  *E21B 19/00*   (2006.01)
  *G01L 5/04*    (2006.01)
  *G01L 5/107*   (2020.01)

(52) U.S. Cl.
  CPC .............. *E21B 23/14* (2013.01); *G01L 5/047* (2013.01); *G01L 5/107* (2013.01)

(56) References Cited

U.S. PATENT DOCUMENTS

| | | |
|---|---|---|
| 2012/0085531 A1 | 4/2012 | Leising et al. |
| 2013/0124166 A1 | 5/2013 | Clemens et al. |
| 2017/0241221 A1* | 8/2017 | Seshadri ................. E21B 23/08 |

FOREIGN PATENT DOCUMENTS

| | | |
|---|---|---|
| WO | 2016043760 A1 | 3/2016 |
| WO | 2016060684 A1 | 4/2016 |
| WO | 2016080982 A1 | 5/2016 |

OTHER PUBLICATIONS

Extended European Search Report issued in EP Application 17837494.8, dated Feb. 25, 2020 (7 pages).
International Search Report issued in the related PCT Application PCT/US2017/044774, dated Nov. 9, 2017 (13 pages).

\* cited by examiner

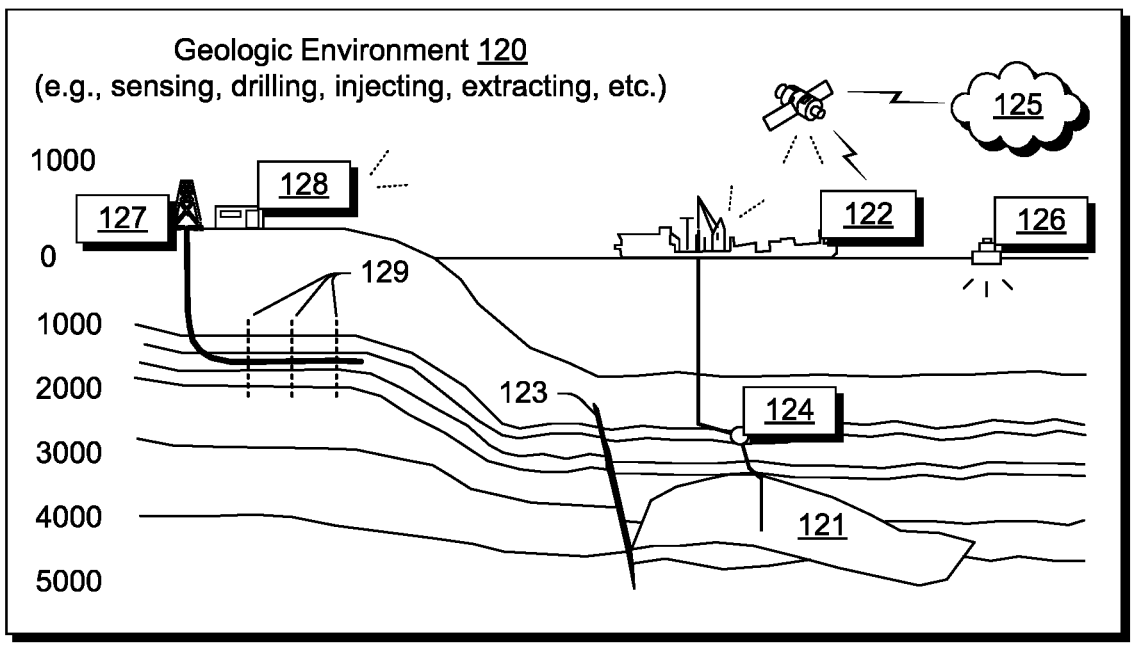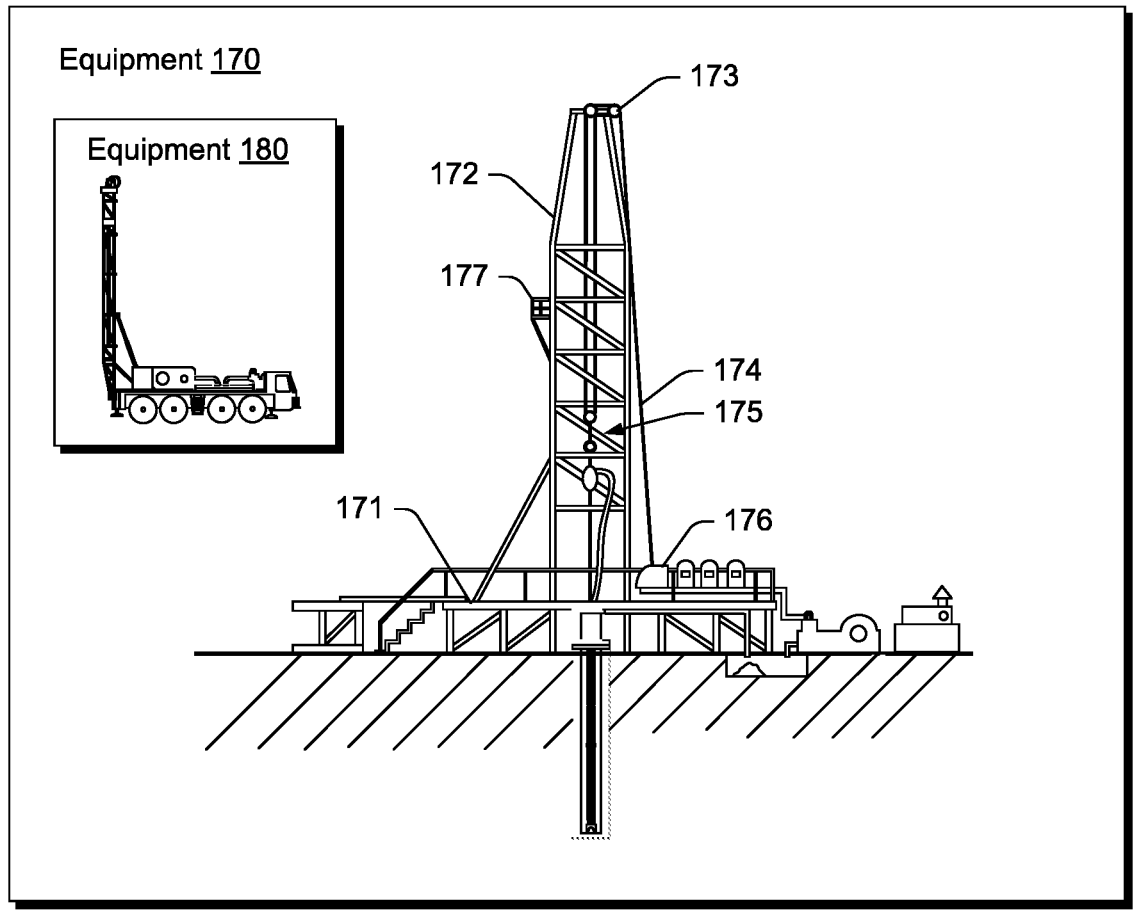
Fig. 1

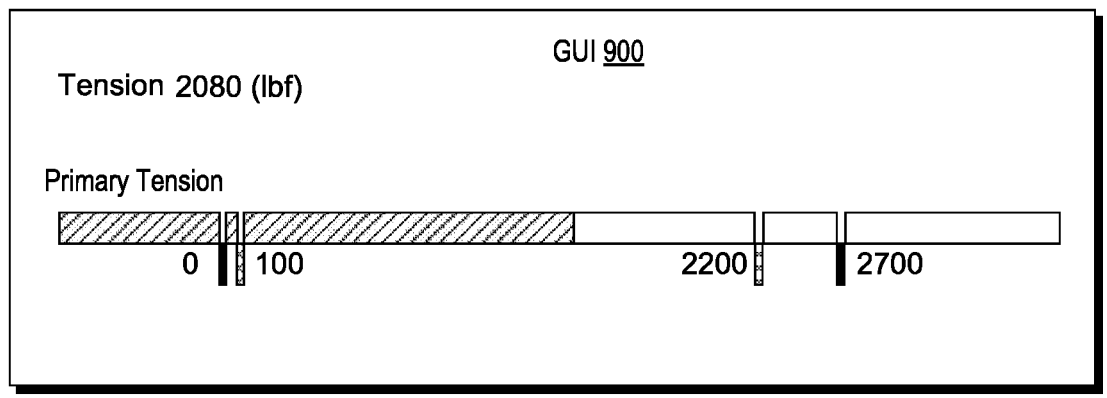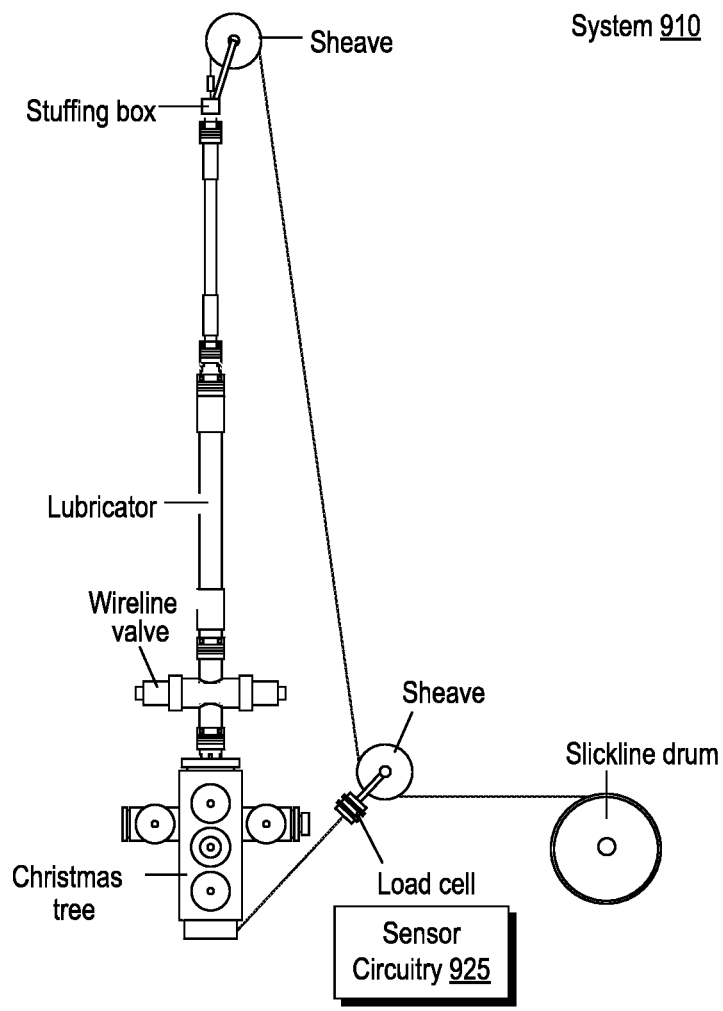
Fig. 9

GUI 1000

Type  Tools  Planners  Help

| General | Borehole | Conveyance Planner |

View  Properties  Advisors  Other Inputs

Conveyance Objective

| Type of Computation | TuffTRAC/UltraTRAC ▼ |

Cable Parameters

| Type | 7-50KA-US-SSC ▼ | |
| Length | 20660.3 | ft ▼ |
| Cable Tension Plot Snapshot Depth | 8418.6 | ft ▼ |

General Parameters

| Toolstring Weight in Air | 3846.0 | +/- 0.0 | lb ▼ |
| Maximum Tool Diameter | 7.0 | +/- 0.0 | in ▼ |
| Toolstring Length | 122.6 | +/- 0.0 | ft ▼ |
| Toolstring Weight in Fluid | 3095.5 | +/- 0.0 | lb ▼ |
| Weight Loss at TD | 0.0 | | lb ▼ |
| Upper Weak Point Rating | 8000 | | lbf ▼ |
| Lower Weak Point Rating | 6900 | | lbf ▼ |
| Release Device Rating | None ▼ | | |
| Mass Tractor Force | 0 | | lbf ▼ |
| Depth Correction added at TD | 0 | | ft ▼ |

Friction and Drag Parameters

| Drag at Surface | 0.0 | +/- 0.0 | lb ▼ |
| Drag Moving Up | 50.0 | +/- 0.0 | lbf ▼ |
| Drag Moving Down | 100.0 | +/- 0.0 | lbf ▼ |
| Friction Coeff. Cable | 0.25 | +/- 0.05 | |
| Friction Coeff. Cable | 0.35 | +/- 0.05 | |
| Friction Coeff. Tool | 0.25 | +/- 0.05 | |
| Friction Coeff. Tool | 0.35 | +/- 0.05 | |

Results   Output

Fig. 10

DOWNHOLE EQUIPMENT TRANSPORT CONTROL

RELATED APPLICATIONS

This application claims priority to and the benefit of a U.S. provisional application having Ser. No. 62/370,111, filed 2 Aug. 2016, which is incorporated by reference herein.

BACKGROUND

A bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and/or to acquire information about a geologic environment, drilling, etc. As an example, a rig can include or be operatively coupled to a conveyance system that can convey equipment into and/or out of a bore. For example, consider a wireline operation where equipment may be transported into and/or out of a bore using a cable controlled via a conveyance system, which may include a rig or be operatively coupled to a rig.

SUMMARY

A method can include receiving information associated with a conveyance of equipment in a borehole via a cable; determining cable tension values based at least in part on a model and at least a portion of the information; conveying the equipment in the borehole via the cable; acquiring a cable tension value via one or more sensors; comparing the acquired cable tension value to at least one of the determined cable tension values; and, based at least in part on the comparing, setting a cable tension limit for further conveying of the equipment in the borehole via the cable. A system can include one or more processors; a network interface operatively coupled to the one or more processors; memory operatively coupled to the one or more processors; and processor-executable instructions stored in the memory and executable by at least one of the one or more processors to instruct the system to: receive information associated with a conveyance of equipment in a borehole via a cable; determine cable tension values based at least in part on a model and at least a portion of the information; convey the equipment in the borehole via the cable; acquire a cable tension value via one or more sensors; compare the acquired cable tension value to at least one of the determined cable tension values; and, based at least in part on a comparison of the acquired cable tension value to at least one of the determined cable tension values, set a cable tension limit for further conveyance of the equipment in the borehole via the cable. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;
FIG. 9 illustrates an example of a graphical user interface and an example of a system;
FIG. 10 illustrates an example of a graphical user interface.

DETAILED DESCRIPTION

Figure 2:
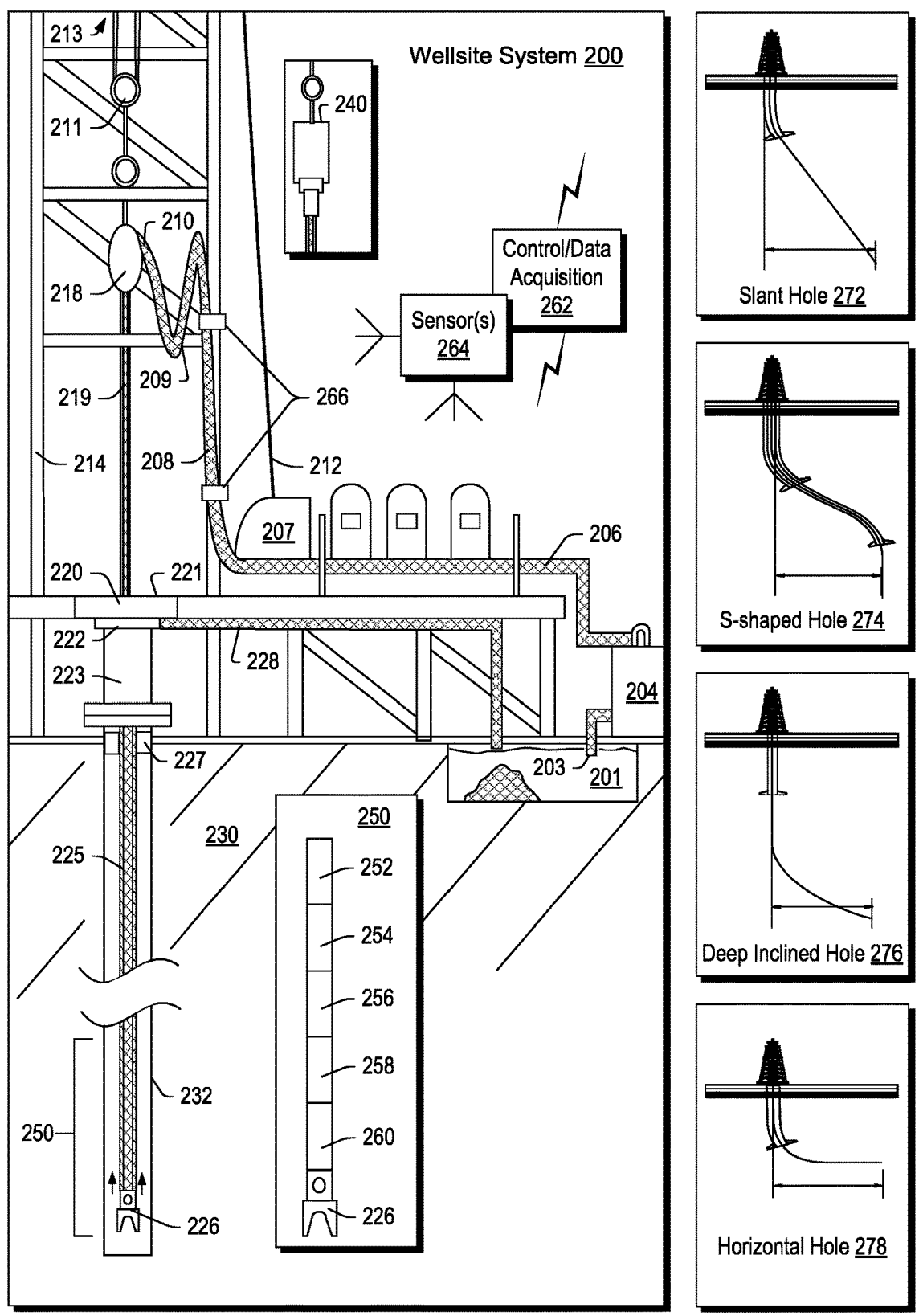
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or placed or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the term can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
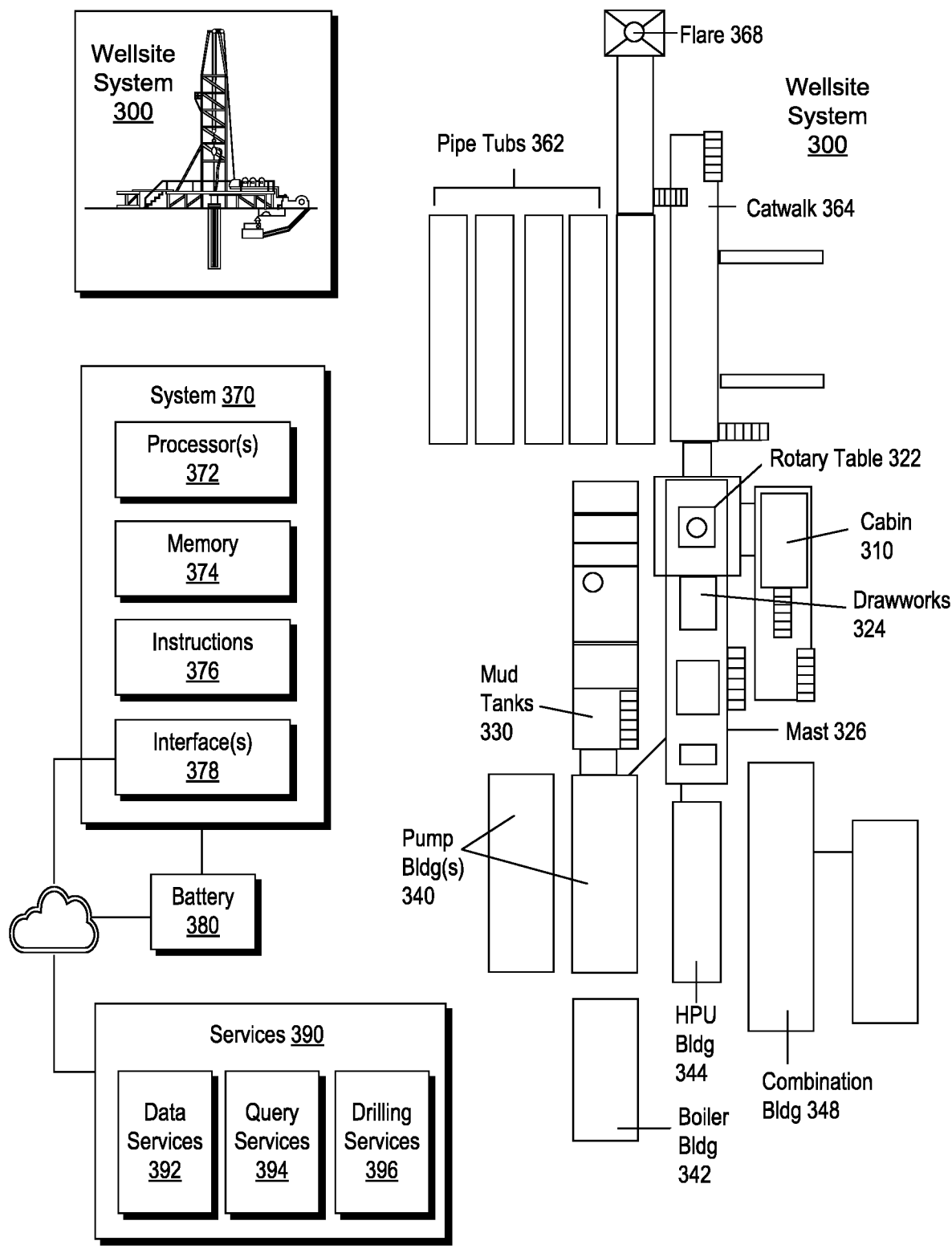
FIG. 3 illustrates an example of a system.

FIG. 3 shows an example of a wellsite system 300, specifically, FIG. 3 shows the wellsite system 300 in an approximate side view and an approximate plan view along with a block diagram of a system 370.

In the example of FIG. 3, the wellsite system 300 can include a cabin 310, a rotary table 322, drawworks 324, a mast 326 (e.g., optionally carrying a top drive, etc.), mud tanks 330 (e.g., with one or more pumps, one or more shakers, etc.), one or more pump buildings 340, a boiler building 342, an HPU building 344 (e.g., with a rig fuel tank, etc.), a combination building 348 (e.g., with one or more generators, etc.), pipe tubs 362, a catwalk 364, a flare 368, etc. Such equipment can include one or more associated functions and/or one or more associated operational risks, which may be risks as to time, resources, and/or humans.

As shown in the example of FIG. 3, the wellsite system 300 can include a system 370 that includes one or more processors 372, memory 374 operatively coupled to at least one of the one or more processors 372, instructions 376 that can be, for example, stored in the memory 374, and one or more interfaces 378. As an example, the system 370 can include one or more processor-readable media that include processor-executable instructions executable by at least one of the one or more processors 372 to cause the system 370 to control one or more aspects of the wellsite system 300. In such an example, the memory 374 can be or include the one or more processor-readable media where the processor-executable instructions can be or include instructions. As an example, a processor-readable medium can be a computer-readable storage medium that is not a signal and that is not a carrier wave.

FIG. 3 also shows a battery 380 that may be operatively coupled to the system 370, for example, to power the system 370. As an example, the battery 380 may be a back-up battery that operates when another power supply is unavailable for powering the system 370. As an example, the battery 380 may be operatively coupled to a network, which may be a cloud network. As an example, the battery 380 can include smart battery circuitry and may be operatively coupled to one or more pieces of equipment via a SMBus or other type of bus.

In the example of FIG. 3, services 390 are shown as being available, for example, via a cloud platform. Such services can include data services 392, query services 394 and drilling services 396.

Figure 4:
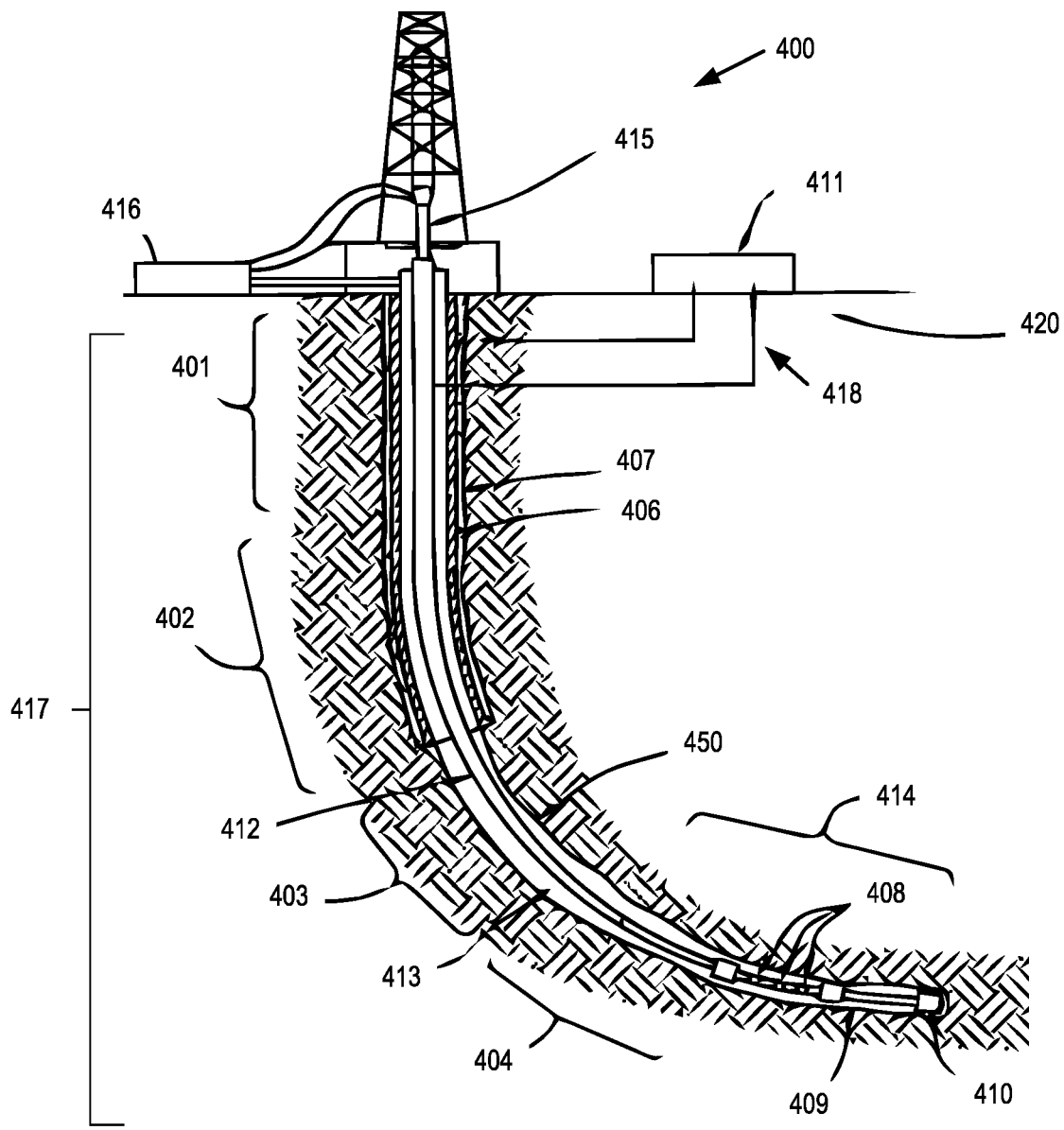
FIG. 4 illustrates an example of a system.

FIG. 4 shows a schematic diagram depicting an example of a drilling operation of a directional well in multiple sections. The drilling operation depicted in FIG. 4 includes a wellsite drilling system 400 and a field management tool 420 for managing various operations associated with drilling a bore hole 450 of a directional well 417. The wellsite drilling system 400 includes various components (e.g., drillstring 412, annulus 413, bottom hole assembly (BHA) 414, kelly 415, mud pit 416, etc.). As shown in the example of FIG. 4, a target reservoir may be located away from (as opposed to directly under) the surface location of the well 417. In such an example, special tools or techniques may be used to ensure that the path along the bore hole 450 reaches the particular location of the target reservoir.

As an example, the BHA 414 may include sensors 408, a rotary steerable system 409, and a bit 410 to direct the drilling toward the target guided by a pre-determined survey program for measuring location details in the well. Furthermore, the subterranean formation through which the directional well 417 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 401, 402, 403 and 404) corresponding to the multiple layers in the subterranean formation. For example, certain sections (e.g., sections 401 and 402) may use cement 407 reinforced casing 406 due to the particular formation compositions, geophysical characteristics, and geological conditions.

In the example of FIG. 4, a surface unit 411 may be operatively linked to the wellsite drilling system 400 and the field management tool 420 via communication links 418. The surface unit 411 may be configured with functionalities to control and monitor the drilling activities by sections in real-time via the communication links 418. The field management tool 420 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 418 according to a drilling operation workflow. The communication links 418 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

Figure 5:
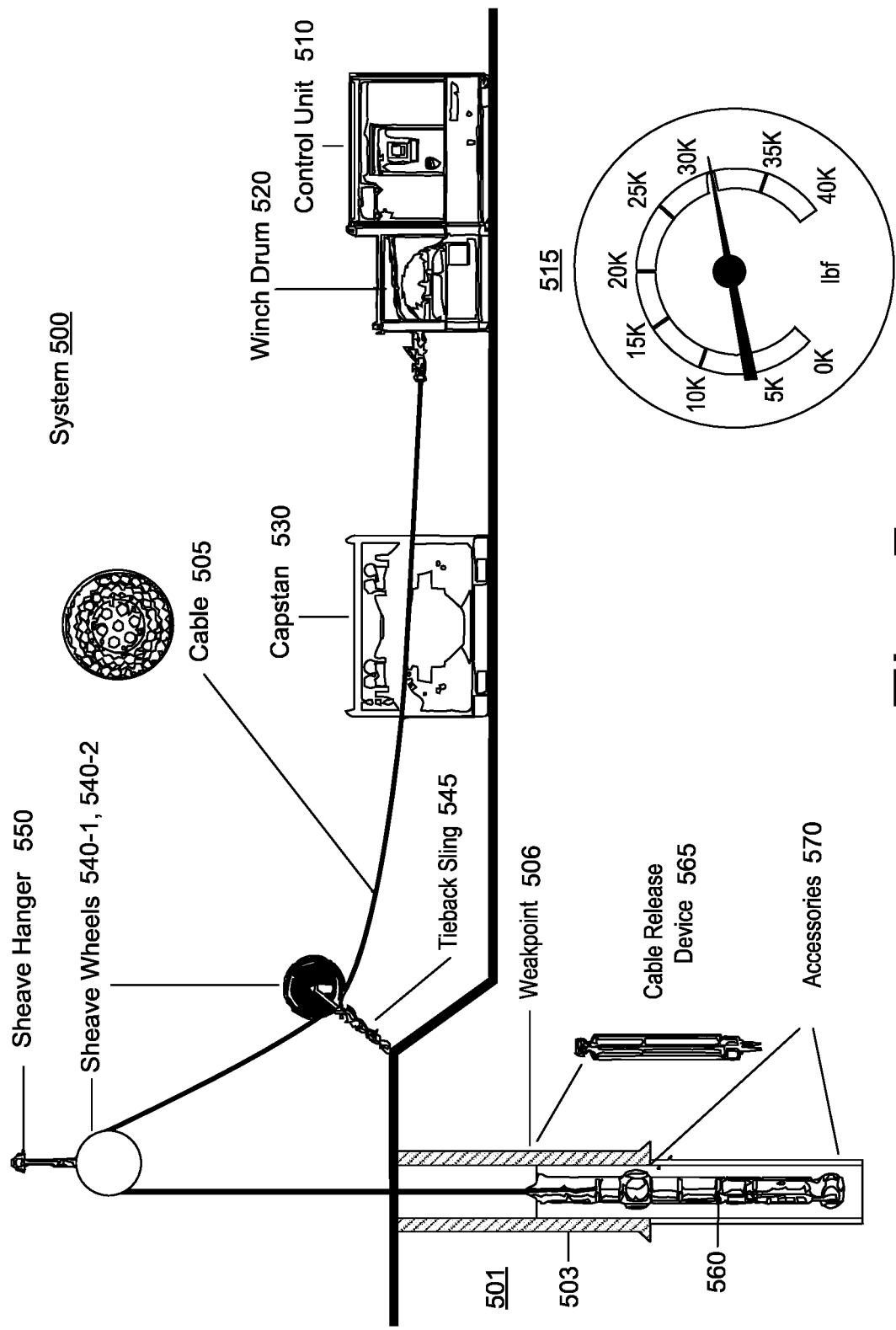
FIG. 5 illustrates an example of a system.

FIG. 5 shows an example of a system 500 and a formation 501 that includes a borehole 503. As shown, a cable 505 is operatively coupled to a winch drum 520 that is operatively coupled to a control unit 510. The control unit 510 can include electronics and electrically powered equipment to operate the winch drum 520, for example, to control rotation of the winch drum 520 to draw in the cable 505 (wind the cable 505 to the winch drum 520) or to let out the cable 505 (e.g., unwind the cable 505 from the winch drum 520).

As an example, one or more pieces of equipment of the system 500 can include one or more sensors. As an example, sensed information may be rendered to a gauge, a display, etc. For example, in FIG. 5, the system 500 includes a gauge 515, which may be a physical gauge or a graphical gauge rendered to a display. As shown in the example of FIG. 5, the gauge 515 includes a dial with a needle (e.g., pointer) where numbers appear and where units for the numbers indicate surface tension, for example, in terms of pounds-force, lbf (e.g., also consider kilograms-force, kgf, etc.). As an example, a dial can include a green portion, a yellow portion and a red portion where green may indicate acceptable tension, yellow may indicate high tension and red may indicate unacceptably high tension that may be associated with risk of damage to one or more pieces of equipment (e.g., the cable, equipment coupled to the cable, etc.).

In the example of FIG. 5, the tension is provided as surface tension associated with the winch drum 520 and the control unit 510 (e.g., and various other components) being surface equipment (e.g., on a platform, on a surface of the Earth, on a ship, etc.).

As shown in FIG. 5, the system 500 includes a capstan 530, sheave wheels 540-1 and 540-2, a tieback sling 545, and a sheave hanger 550. As an example, the sheave hanger 550 can be operatively coupled to a support structure (e.g., a rig or rig-like structure, etc.). As an example, the tieback sling 545 can be operatively coupled to a structure (e.g., a rig, a platform, the Earth, etc.).

The system 500 may be utilized, for example, in a wireline operation. For example, the cable 505 may be considered to be a wireline cable that is operatively coupled to equipment 560 that may be considered to be or to include logging equipment. As shown in FIG. 5, the cable 505 includes a region referred to as a weakpoint 506 that is uphole from the equipment 560 where a cable release device 565 (e.g., or cable release assembly) may be disposed at least in part between the cable 505 and the equipment 560 or otherwise operatively coupled to the cable 505 and the equipment 560. As shown in the example of FIG. 5, the equipment 560 can optionally include one or more accessories 570, for example, to facilitate movement of the equipment 560 in the borehole 503 of the formation 501.

Figure 6:
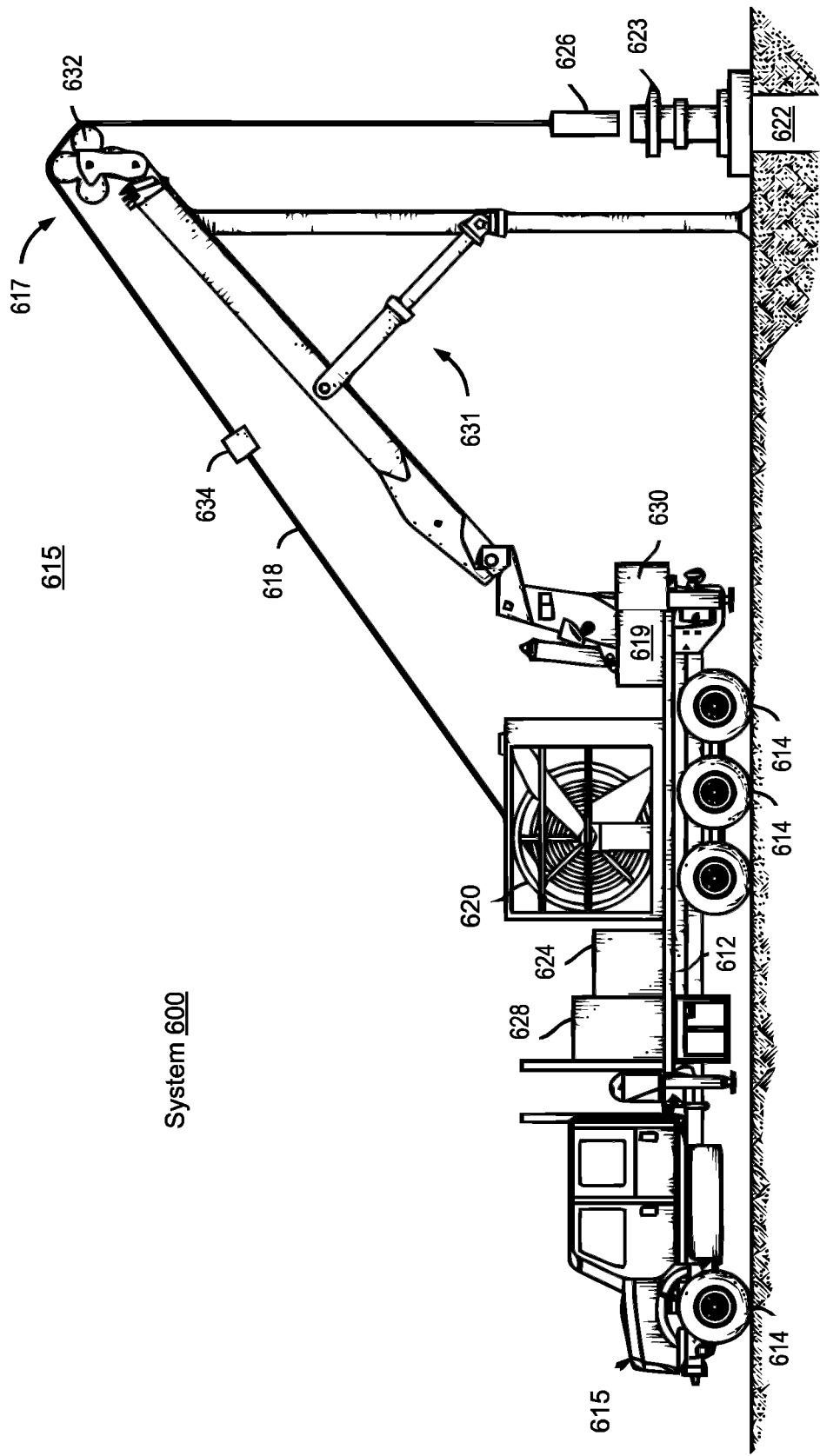
FIG. 6 illustrates an example of a system.

FIG. 6 shows an example of a system 600. Such a system may be a mobile well services system that includes a vehicle 610 that includes a chassis or frame 612 having a plurality of wheels 614 attached thereto. The chassis 612 may be self-propelled and include a truck cabin 615 attached thereto, a prime mover 628, such as a diesel engine or the like, for moving the chassis 612 and providing power to the system 600. As an example, the chassis 612 may be adapted to be towed by a separate vehicle.

An elevation device 616, such as a crane, a mast or the like, is mounted to the chassis 612 and to support a spooled element 618 that extends from a drum and winch assembly 620. The drum and winch assembly 620 can be operable to raise and lower the spooled element 618 into a wellbore 622 or the like via a wellhead assembly 623 while the spooled element 618 is supported by the elevation device 616.

A sheave assembly may include a starwheel assembly that allows the sheave assembly 617 to pass a connector 634, a tool 626 or the like attached to the spooled element 618 while the spooled element 618 is raised and/or lowered. The elevation device 616 can include an actuator 619, such as an electric motor, a hydraulic motor or the like for raising and lowering, deploying supports or the like.

As shown, at least one acquisition system 624 can be included in the system 600 and may be in operable communication with a downhole tool 626 disposed on the spooled element 618.

As an example, the prime mover 628 may be a diesel engine, a power pack or power take-off (PTO) from a diesel engine or the like and operable to supply power, such as via hydraulic fluid, electrical power, combinations thereof, or by suitable power transmission. The prime mover 628 can supply power to at least the drum and winch assembly 620 and, for example, the elevation device 616 (e.g., the actuator 619 or the like), the acquisition system 624, etc. As an example, a PTO can be a type of power transfer unit (PTU); noting that a system may include one or more types of PTUs. As an example, a PTU can be a transmission that transfers energy from a source (e.g., an engine, etc.) to a mechanical system (e.g., a train of components, etc.).

In operation, the system 600 can be disposed adjacent to the wellbore 622 and the drum and winch assembly 620 can be actuated to lower the tool 626 on the spooled element 618 through the wellhead assembly 623 and into the wellbore 622. While lowered into the wellbore 622, the tool 626 may, for example, perform a well logging or servicing task or operation, such as gathering and transmitting information to the acquisition system 624. When a task or operation is complete, the spooled element 618 and tool 626 can be raised by the drum and winch assembly 620 and the system 600 may be moved to another location and perform another well servicing task.

Figure 7:
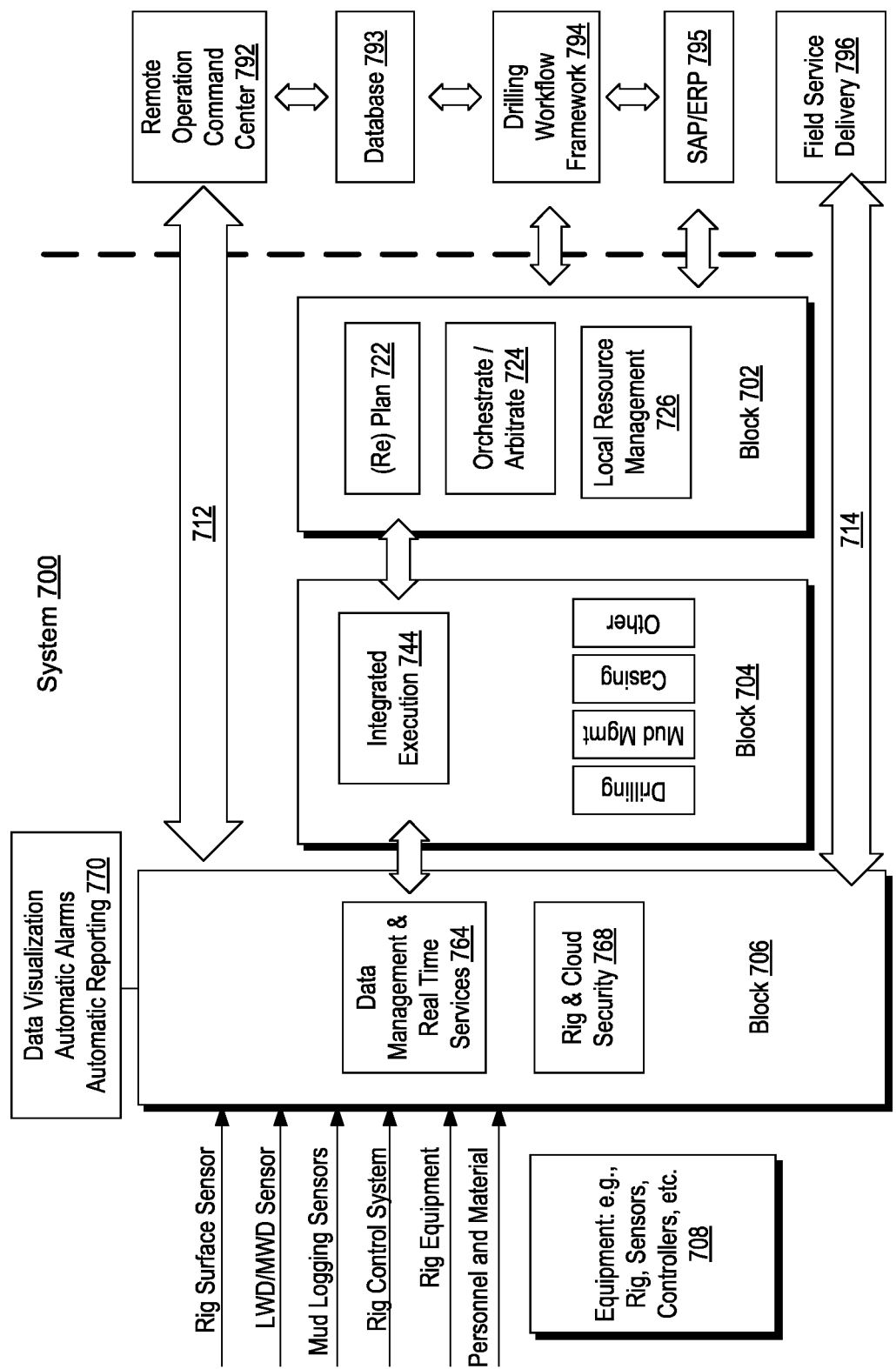
FIG. 7 illustrates an example of a system.

FIG. 7 shows an example of a system 700 that includes various components that can be local to a wellsite and includes various components that can be remote from a wellsite. As shown, the system 700 includes a block 702, a block 704, a block 706 and an equipment block 708. These blocks can be labeled in one or more manners other than as shown in the example of FIG. 7. In the example of FIG. 7, the blocks 702, 704, 706 and 708 can be defined by one or more of operational features, functions, relationships in an architecture, etc.

As an example, the block 702 can be associated with a well management level (e.g., well planning and/or orchestration) and can be associated with a rig management level (e.g., rig dynamic planning and/or orchestration). As an example, the block 704 can be associated with a process management level (e.g., rig integrated execution). As an example, the block 706 can be associated with a data management level (e.g., sensor, instrumentation, inventory, etc.). As an example, the equipment block 708 can be associated with a wellsite equipment level (e.g., wellsite subsystems, etc.).

In the example of FIG. 7, the block 702 includes a plan/replan block 722, an orchestrate/arbitrate block 724 and a local resource management block 726. In the example of FIG. 7, the block 704 includes an integrated execution block 744, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 7, the block 706 includes a data management and real-time services block 764 (e.g., real-time or near real-time services) and a rig and cloud security block 768. In the example of FIG. 7, the equipment block 708 is shown as being capable of providing various types of information to the block 706. For example, consider information from a rig surface sensor, a LWD/MWD sensor, a mud logging sensor, a rig control system, rig equipment, personnel, material, etc. In the example, of FIG. 7, a block 770 can provide for one or more of data visualization, automatic alarms, automatic reporting, etc. As an example, the block 770 may be operatively coupled to the block 706 and/or one or more other blocks.

As mentioned, a portion of the system 700 can be remote from a wellsite. For example, to one side of a dashed line appear a remote operation command center block 792, a database block 793, a drilling workflow framework block 794, a SAP/ERP block 795 and a field services delivery block 796. Various blocks that may be remote can be operatively coupled to one or more blocks that may be local to a wellsite system. For example, a communication link 712 is illustrated in the example of FIG. 7 that can operatively couple the blocks 706 and 792 (e.g., as to monitoring, remote control, etc.), while another communication link 714 is illustrated in the example of FIG. 7 that can operatively couple the blocks 706 and 796 (e.g., as to equipment delivery, equipment services, etc.). Various other examples of possible communication links are also illustrated in the example of FIG. 7.

In the example of FIG. 7, various blocks can be components that may correspond to one or more software instruction sets (e.g., processor-executable instructions, add-ons, plug-ins, etc.), hardware infrastructure, firmware, equipment, or any combination thereof. Communication between the components may be local or remote, direct or indirect, via application programming interfaces, and procedure calls, or through one or more communication channels.

As an example, the block 706 (e.g., a core services block) can include functionality to manage individual pieces of equipment and/or equipment subsystems. As an example, such a block can include functionality to handle basic data structure of the oilfield, such as the rig, acquire metric data, produce reports, and manages resources of people and supplies. As an example, such a block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

In the example of FIG. 7, the equipment block 708 can correspond to various controllers, control unit, control equipment, etc. that may be operatively coupled to and/or embedded into physical equipment at a wellsite such as, for example, rig equipment. For example, the equipment block 708 may correspond to software and control systems for individual items on the rig. As an example, the equipment block 708 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

As an example, a system can include a framework that can acquire data such as, for example, real-time data associated with one or more operations such as, for example, a drilling operation or drilling operations. As an example, consider the PERFORM™ toolkit framework (Schlumberger Limited, Houston, Tex.). As an example, a service can be or include one or more of OPTIDRILL™, OPTILOG™ and/or other services marketed by Schlumberger Limited, Houston, Tex. The OPTIDRILL™ technology can help to manage downhole conditions and BHA dynamics as a real-time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework). The OPTILOG™ technology can help to evaluate drilling system performance with single- or multiple-location measurements of drilling dynamics and internal temperature from a recorder. As an example, post-run data can be analyzed to provide input for future well planning.

Figure 8:
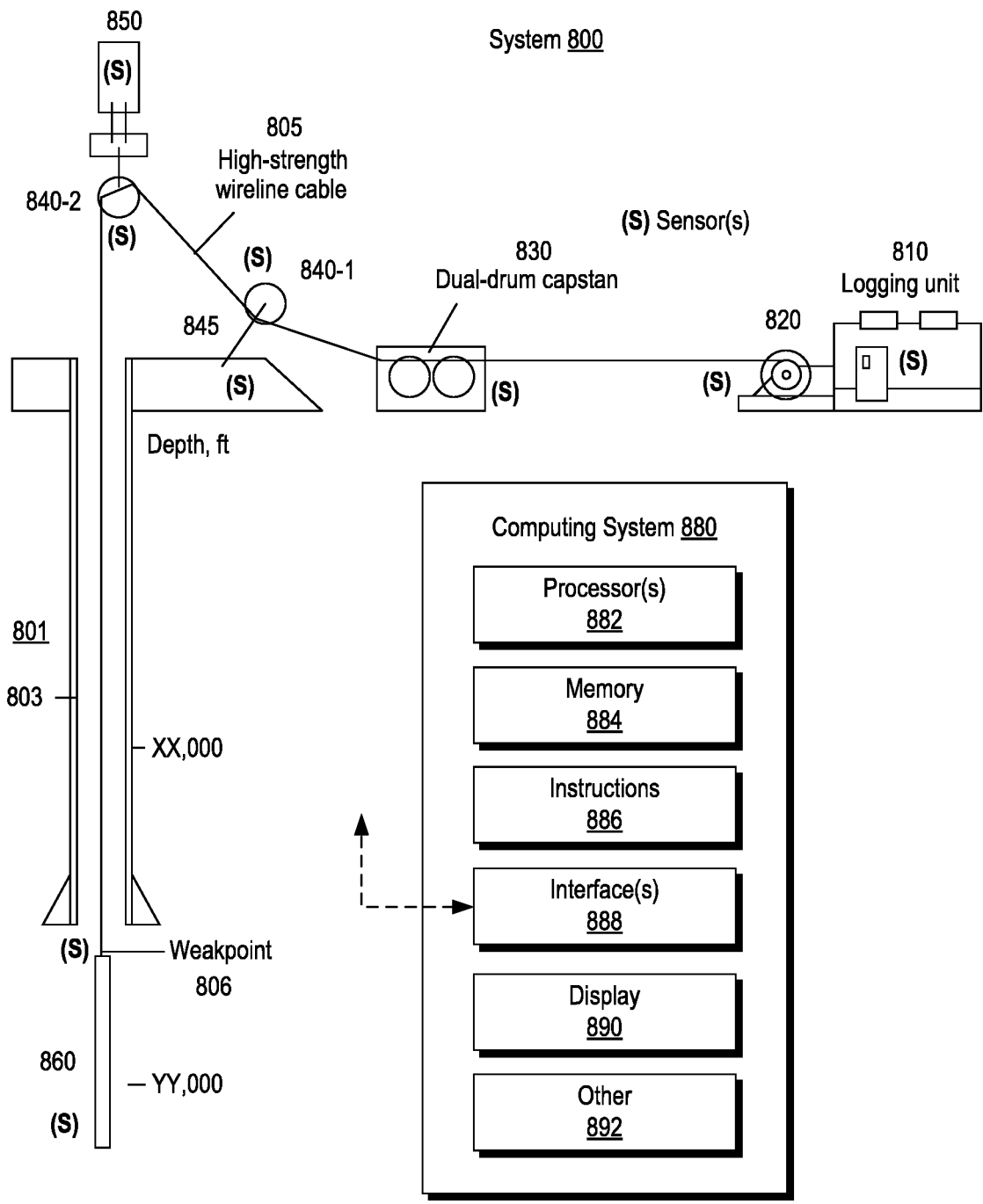
FIG. 8 illustrates an example of a system and an example of a computing system.

FIG. 8 shows an approximate schematic view an example of a system 800 and a formation 801 that includes a borehole 803. In the example of FIG. 8, the system 800 may be an onshore system, an offshore system, a vehicle-based system, a ship-based system, a platform-based system, etc. As an example, the system 800 may be suitable for wireline operations and/or one or more other types of operations. As an example, the system 800 may be suitable for deployment of equipment such as, for example, an electric submersible pump (ESP) that may be a cable deployed ESP (e.g., deployed via a multi-phase power cable, etc.).

As shown in the example of FIG. 8, a cable 805 is operatively coupled to a winch drum 820 that is operatively coupled to a control unit 810. The control unit 810 can include electronics and electrically powered equipment to operate the winch drum 820, for example, to control rotation of the winch drum 820 to draw in the cable 805 (wind the cable 805 to the winch drum 820) or to let out the cable 805 (e.g., unwind the cable 805 from the winch drum 820).

In the example of FIG. 8, the tension is provided as surface tension associated with the winch drum 820 and the control unit 810 (e.g., and various other components) being surface equipment (e.g., on a platform, on a surface of the Earth, on a ship, etc.).

As shown in FIG. 8, the system 800 includes a capstan 830, sheave wheels 840-1 and 840-2, a tieback sling 845, and a sheave hanger 850. As an example, the sheave hanger 850 can be operatively coupled to a support structure (e.g., a rig or rig-like structure, etc.). As an example, the tieback sling 845 can be operatively coupled to a structure (e.g., a rig, a platform, the Earth, etc.).

The system 800 may be utilized, for example, in a wireline operation. For example, the cable 805 may be considered to be a wireline cable that is operatively coupled to equipment 860 that may be considered to be or to include logging equipment. As shown in FIG. 8, the cable 805 includes a region referred to as a weakpoint 806 that is uphole from the equipment 860 where a cable release device 865 (e.g., or cable release assembly) may be disposed at least in part between the cable 805 and the equipment 860 or otherwise operatively coupled to the cable 805 and the equipment 860. As shown in the example of FIG. 8, the equipment 860 can optionally include one or more accessories 870, for example, to facilitate movement of the equipment 860 in the borehole 803 of the formation 801.

In the example of FIG. 8, the capstan 830 may be a dual-drum capstan. Such equipment may aim to reduce risk of cable crushing and drum damage. As an example, the capstan 830 may include hydraulically powered grooved wheels that include several wraps of cables around them. In such an example, a rig side (e.g., borehole side) of the capstan 830 is under high tension and the drum side is maintained at a lower tension for spooling onto the winch drum 820. A capstan can help to extend life of a cable. As an example, during operation, a capstan may be controlled, for example, to maintain a desired tension balance, to maintain a desired (e.g., synchronized) speed, etc.

In the example of FIG. 8, the system 800 can be operatively coupled to a computing system 880. For example, one or more pieces of equipment of the system 800 can include one or more sensors. As an example, sensed information may be transmitted to and received by the computing system 880 (e.g., via wire and/or wireless circuitry).

As shown in FIG. 8, the computing system 880 includes one or more processors 882, memory 884 operatively coupled to at least one of the one or more processors 882, instructions 886 that can be, for example, stored in the memory 884, and one or more interfaces 888. As shown, the computing system 880 can include a display 890 or displays as well as, for example, one or more other components 892.

As an example, the computing system 880 can include one or more processor-readable media that include processor-executable instructions executable by at least one of the one or more processors 882 to cause the computing system 880 to control one or more aspects of the system 800 (e.g., data acquisition, equipment control, etc.). In such an example, the memory 884 can be or include the one or more processor-readable media where the processor-executable instructions can be or include instructions. As an example, a processor-readable medium can be a computer-readable storage medium that is not a signal and that is not a carrier wave.

As an example, the computing system 880 can include the display 890 such that information may be rendered to the display 890. As an example, one or more graphical user interfaces (GUIs) may be rendered to the display 890 (e.g., based at least in part on execution of instructions 886, etc.). For example, a graphical gauge may be rendered to the display 890. As an example, information such as surface tension information may be rendered to the display 890. For example, consider surface tension in terms of pounds-force, lbf (e.g., also consider kilograms-force, kgf, etc.). As an example, information rendered to a display may be color coded (e.g., a green portion, a yellow portion and a red portion where green may indicate acceptable tension, yellow may indicate high tension and red may indicate unacceptably high tension that may be associated with risk of damage to one or more pieces of equipment (e.g., the cable, equipment coupled to the cable, etc.)).

As an example, the computing system 880 can facilitate conveyance of wireline logging tools into a well. In such an example, the computing system 880 may receive information such as, for example, consider one or more of the directional profile, downhole hardware (tubing, values, etc.), pressures, fluid types, and characteristics of the wireline tools, cables, and weak points. As an example, the computing system 880 may receive information via at least one interface such as, for example, at least one network interface (e.g., one or more of the interfaces 888 may be a network interface).

As an example, the computing system 880 may include or be operatively coupled to a planning computing system. For example, consider a computing system for planning the deployment of the wireline tools that can commence a workflow with tension modeling where surface and head tensions are estimated from one or more computational models that represent physical components, physical phenomena, etc. As an example, one or more estimated head tensions may be used to determine if a tool or tools are to be conveyed in a particular manner, for example, due to a well's high deviation and/or one or more other characteristics.

As an example, modeled tensions may be used to determine equipment to be utilized and cable tensions expected on a real job. As an example, a computing system may facilitate (e.g., recommend, etc.) equipment selection, for example, to comport with safe working loads of one or more cables and/or other equipment (e.g., to assure that loads are not exceeded, etc.).

As an example, at a planning stage, a workflow can include selection of cable and a release device so the cable can be safely released from the tool if the tool becomes stuck. As an example, a release device may be at and/or define a weak point, for example, at a region where it is installed in a logging head. For example, a release device can be engineered to break in a certain tension pull range. As an example, one or more limits of a weak point and cable strength can lead to unintentional pull offs (UPO) if a winch operator fails to closely monitor tension on the cable or weak point.

As an example, during a wireline operation, a winch operator in a system such as the system 500 may be instructed to continually monitor the gauge 515, which may show real time tension. In such an example, the winch operator may aim to assure that the tool (e.g., the equipment 560) is moving while running the tool (e.g., the equipment 560) into the borehole 503. While pulling out the hole, the winch operator can aim to ensure that the tool (e.g., the equipment 560) and/or the cable 505 does not become stuck and that the safe working load is not exceeded on the cable 505, weak point 506, and/or one or more other parts. While various features of the system 500 are mentioned, such an approach may optionally be implemented with respect to the system 800 (e.g., in a manual mode of operation, etc.).

As an example, the computing system 880 of FIG. 8 may include modeling software that can be used to predict tension seen at the surface as well as tension at one or more points along the cable 805 (e.g., up to the tool head, etc.).

As an example, the computing system 880 may include or be operatively coupled to or otherwise receive information generated by the TOOLPLANNER™ framework (Schlumberger Limited, Houston, Tex.).

As an example, a framework may be used for prediction of cable tension as well as, for example, for determination of one or more conveyance techniques such as, for example, tractoring, pump down operations, etc. As an example, a framework may receive input such that it can consider forces from producing or injecting fluids on a cable, a toolstring, etc.

As an example, the computing system 880 can provide for integration of real time winch control with results of a plan. For example, the computing system 880 can include receiving information from one or more sensors (S) and receiving information generated by a planning framework.

As an example, during a field operation, the computing system 880 can provide real-time (e.g., near real-time accounting for computation time and transmission times) feedback to one or more devices that may be handheld and/or otherwise viewable (e.g., or audible and/or tactile) by one or more operations crew. In such an example, the computing system 880 can facilitate proper setting of tension alarms and/or winch shutdowns.

As an example, results of a planning framework may be used to automatically set one or more limits for winch control. In such an example, the one or more limits can help to ensure that one or more safe loads are not exceeded.

As an example, while real-time data are being acquired (e.g., via one or more of the one or more sensors), a planned tension model can be updated and, for example, tuned based on at least a portion of the real time data. Such an approach can allow real time feedback to improve accuracy of a plan with improved alarm settings and control and lead to further automation of the winch control system deployment of the logging tools.

As an example, the computing system 880 may be utilized for one or more other type of load movements where a load is carried by a cable or cables. For example, a framework may provide for load planning (e.g., load movement planning) for a different type of operation (e.g., other than wireline logging, etc.). As an example, the computing system 880 may integrate planned loads with actual measurements to safely control equipment such as drawworks used in the oil industry or other types of crane systems.

In the example of FIG. 8, the system 800 can generate real-time measurements that can be fed back and considered with respect to a plan where output of the computing system 880 can be utilized, for example, to drive automated winch control. In such an example, automation may be at a level that is optionally without an onsite operator that constantly monitors and that constantly controls the winch operation. For example, automation may be effectuated via a remote location or, for example, via a cabin where monitoring may be performed and optional intervention where, for example, an alarm is triggered, etc.

As an example, the computing system 880 may provide for stopping of a winch when a tension threshold is exceeded, constant speed logging, and/or running to a certain depth and stopping. As mentioned, the computing system 880 may operate using feedback (e.g., sensed information) and one or more models. As an example, the computing system 880 may provide for automation of tool deployment. As an example, the computing system 880 may provide for risk management as to one or more physical phenomena that may be detrimental to a field operation (e.g., people, formation, downhole structures, equipment, etc.).

As an example, the computing system 880 may provide for implementation of a Tension Limiting Systems (TLS) that causes a winch drum to "slip" or stop when hydraulic winch pump pressure or electric torque exceeds a value (e.g., a user preset value, a computed value, etc.). As an example, the computing system 880 may receive information from one or more sensors and, based at least on a portion of such information, adjust a value or values associated with tension limiting. As an example, such an approach may optionally be model based where one or more models are utilized to determine whether an adjustment or adjustments are to be made to a value associated with tension limiting. As an example, a plan may include tension values that depend on time, depth, and/or one or more other factors. For example, a tension limiting method can include incorporating actual tension measurements or self-adjust depending on the deployed depth of the equipment.

As an example, the computing system 880 may be implemented with one or more wireline trucks, one or more offshore units, etc. As an example, the computing system 880 may electronically link to what may be a user settable tension shutdown value and/or alarm value. In such an example, the computing system 880 can perform tasks such as setting one or more values. For example, the computing system 880 may generate a schedule where the schedule may be updated based at least in part on information input (e.g., via a sensor, sensors, user, users, etc.). As an example, the computing system 880 may be wired and/or wirelessly coupled to one or more sensors and/or one or more input devices where information may be received by the computing system 880. Such information may be utilized in a model-based approach to update one or more values associated with a field operation that includes deployment and/or retrieval of equipment from a borehole via one or more cables that can be translated, wrapped, etc. to move the equipment.

As an example, a framework may include one or more features of the TOOLPLANNER™ framework, the MAXWELL™ framework, the Perform Tool Kit (PTK)™ framework, and/or the INSITUPRO™ framework (Schlumberger Limited, Houston, Tex.) and/or one or more other types of model-based frameworks for handling loads, etc.

As an example, the computing system 880 may include generating and/or receiving information such as information as to one or more of well profile, wellbore fluid dynamics, tool weights, friction and drag coefficients, etc. In such an example, the computing system 880 and/or a framework may predict relatively accurate estimates of actual cable tensions. Such an approach provides for plan integration with winch control and acquisition. Such an approach can provide for adjusting one or more planned tensions with information as to actual tension (e.g., and/or information germane to actual tension, etc.).

As an example, a planning framework can be run where import or input of a well survey occurs along with, for example, one or more other borehole characteristics such as pressures and fluid type. In such an example, the planning framework can provide for selection and/or input of one or more of logging tool, cable, and/or other equipment properties. As an example, a planning framework can output estimated surface tensions as well as tensions along a cable and specifically tension at a tool head.

As an example, planned results can be consumed by a winch display and control system, for example, via a direct connection (e.g., embedded or via standard communications such as Ethernet) and/or by importing a results file.

As an example, winch display instructions can provide for rendering information to one or more displays where the information may include cable tension, for example, as read from one or more real-time devices (e.g., sensors, etc.). As an example, one or more alarm limits can be automatically set from one or more planned tensions so that a maximum safe pull of a system is not exceeded. As an example, as cable is deployed or removed from a borehole, one or more alarms and shutdown settings can be changed, for example, as the normal tension increases or decreases. Such an approach can optionally be implemented in an automatic manner (e.g., without user intervention, etc.).

As an example, an integrated system (e.g., planning framework and winch control and data acquisition) can allow for adjustment of a model and/or model-based adjustments (e.g., control, etc.). For example, consider comparing normal tension measured when a tool and/or a cable are moving freely to a model. In such an example, where the two diverge, the model can be rerun by adjusting one or more friction and/or drag parameters to match measured tension. In such an approach, output can be used for automatic tension alarm and shutdown settings.

As an example, a computing system such as, for example, the computing system 880 of FIG. 8, can include fitting instructions that can receive data and use the data to adjust parameters of a model. For example, model parameters may be fit to the data. In such an example, a model can be updated and utilized for estimation of one or more control parameters of a winch, one or more tensions (e.g., future tensions with respect to time, depth, length along a borehole trajectory, etc.), etc.

As an example, a winch control and display system can include a numeric or graphic display(s) for displaying tension on the cable as measured at surface by a tension measuring device. As an example, a graphic display could be round gauge, bar, or chart and/or can be electronic or be spring-mass, or hydraulic analog gauges.

As an example, a gauge or gauges can include alarm limit(s) and/or shutdown limit(s). For example, FIG. 9 shows an example of a graphical user interface 900 that includes low and high tension alarms and shutdown values. As an example, the computing system 880 of FIG. 8 may include instructions to render the GUI 900 to a display where, for example, one or more of the limits may be updated and rendered based at least in part on sensed information and/or other information associated with a field operation.

FIG. 9 also shows an example of a system 910 that includes sensor circuitry 920. For example, the sensor circuitry 920 can be operatively coupled to a load cell. In such an example, the load cell may be operatively coupled to a sheave where a cable is guided at least in part by the sheave. As an example, a cable may run from a drum and/or a capstan through a sheave where the sheave directs the cable at an angle.

As an example, a weight downhole of equipment and/or a cable (e.g., cable and equipment weight) may be measured using one or more load cells. For example, consider a load cell attached to a wellhead and then to a pulley through which a cable is directed from a drum to the top of a lubricator.

As an example, a cable may be a slickline where equipment is operatively coupled to the slickline for conveyance in a borehole.

As an example, a sensor may include a strain gauge (e.g., an electronic device, piezo-electronic device, etc.). As an example, a load cell may be a wet load cell or a dry load cell. As an example, a load cell can include one or more strain gauges. As an example, orientation of strain gauges may be leveraged to enhance accuracy of a downhole load. As an example, one or more other measures may be taken to enhance accuracy. For example, one or more techniques may be implemented to increase accuracy with respect to depth. As an example, a system (e.g., a model, a measurement system, etc.) may account for depth related inaccuracies (e.g., increasing uncertainty with depth, etc.).

As an example, a load cell may be sized based on equipment, cable and/or depth. As an example, a larger load cell may provide a greater amount of uncertainty in terms of tension values. As an example, a method may account for such factors. For example, a potential three percent inaccuracy in a 5,000 lb load cell equates to an accuracy of about +/−150 lb; whereas, for a 10,000 lb load cell, the same degree of potential inaccuracy amounts to an accuracy of about +/−300 lbs.

As an example, a computing system such as, for example, the computing system 880 of FIG. 8, may be operatively coupled to one or more sensors. As an example, such a computing system may receive identifying information as to the one or more sensors where such information may be utilized to retrieve specifications for the one or more sensors. As an example, where a model may determine tension values, optionally modeling a particular sensor, in a field operation, where a mismatch may exist between that particular sensor and a field sensor, a computing system may call for one or more adjustments to a model and/or otherwise generate updated information (e.g., as to actual sensors utilized).

As an example, a computing system may acquire sensor data and acquire sensor specification or identification data. In such an example, the computing system can be "sensor aware" and may make one or more adjustments based on sensor awareness, including, for example, swapping of a sensor for another sensor (e.g., during a field operation, etc.). Such sensor awareness can optionally include accounting for load limits, accuracy ranges, dynamics, settling response to variations in tension, etc.

As an example, the computing system 880 of FIG. 8 can include instructions to render a GUI to a display such as, for example, the GUI 1000 of FIG. 10. As an example, the GUI 1000 of FIG. 10 may be associated with a planning framework.

As an example, a planning framework can include various inputs for information. For example, consider well surface information, cable and tool string weights in fluid, friction coefficients, and one or more other parameters (e.g., parameter values, etc.). An example, the GUI 1000 of FIG. 10 can be associated with the TOOLPLANNER™ framework.

In the example of FIG. 10, the GUI 1000 includes various examples of numeric values associated with conveyance. The GUI 1000 includes fields for various parameters such as, for example, cable parameters (e.g., type, length, etc.), general parameters (e.g., toolstring, "weak" point, force, etc.), and friction and drag parameters (e.g., drag moving uphole, drag moving downhole, friction cable, etc.). As an example, a system may exhibit hysteresis as to uphole and downhole directions. As an example, a system may account for such hysteresis, which may differ depending on geometry, surrounding formation, fluid (e.g., mud), accessories, etc.

Figure 11:
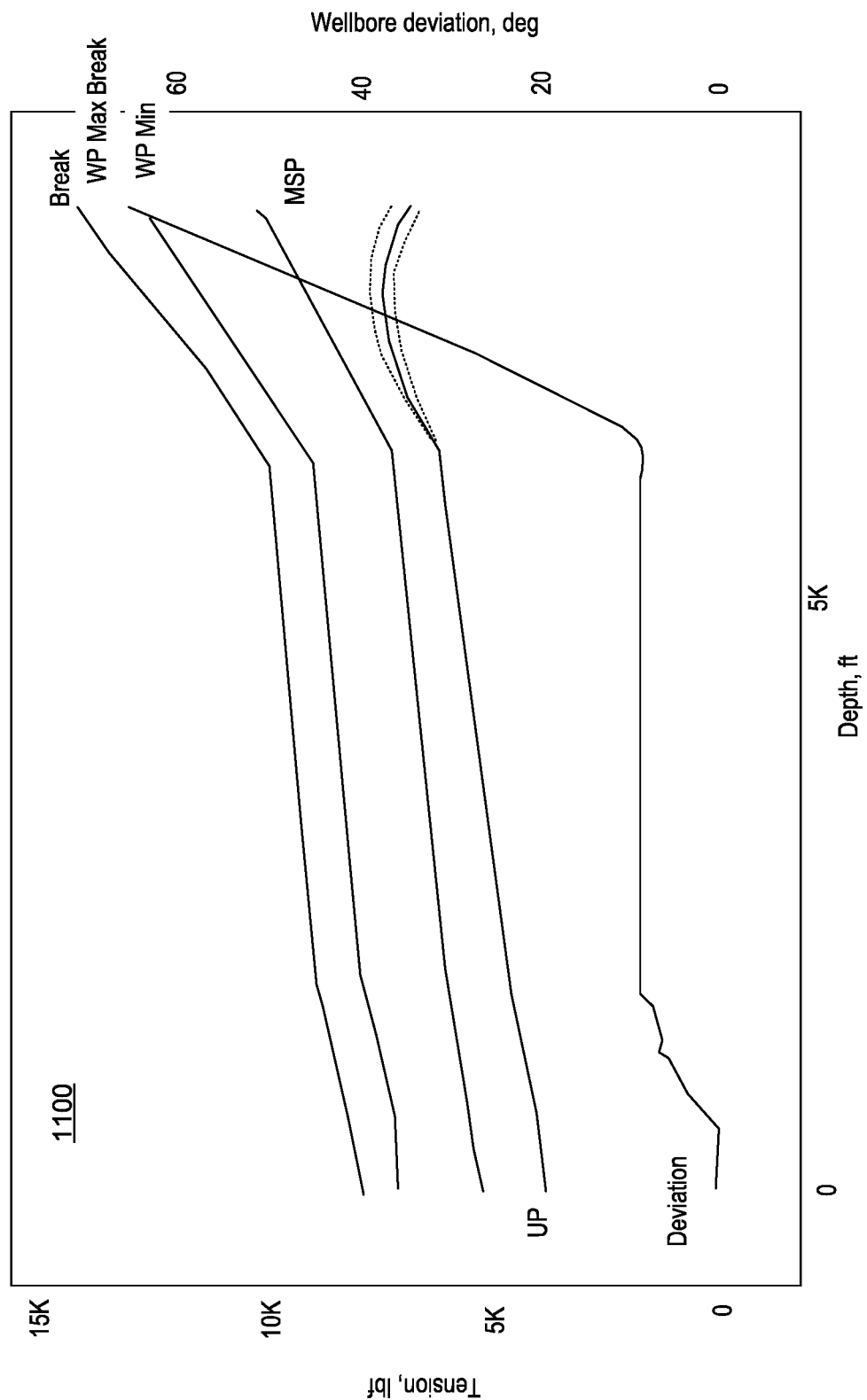
FIG. 11 illustrates an example of a plot.

FIG. 11 shows an example of a plot 1100 of results that are based at least in part on inputs such as, for example, the inputs of the GUI 1000 of FIG. 10. In the plot 1100, information includes calculated "up" tension and Maximum Safe Pull (MSP). The plot 1100 shows tension on one axis, wellbore deviation in degrees on another axis and depth on the abscissa. As shown, the deviation is relatively constant over a depth span to about 6,000 ft (e.g., about 2,000 meters). At deeper depths, the deviation becomes more severe, reaching approximately 60 degrees. As shown in the plot 1100, the tension can depend on deviation and depth. Information in the plot 1100 can be utilized as part of a planning workflow and/or an execution workflow where tension (e.g., cable tension) may be a relevant factor as to success of one or more conveyance operations. As an example, a drillpipe may be a type of cable where a drillpipe is utilized to convey a tool, etc. As an example, a coiled tubing may be a type of cable where a coiled tubing is utilized to convey a tool, etc. In such examples, results may be generated for a drillpipe and/or for a coiled tubing using a model or models.

As an example, the computing system 880 of FIG. 8 may combine planned tension, measured tension, and provide for changing setting adjustment(s) based on at least in part on the plan and based at least in part on measured information (e.g., measured tension(s)). As an example, the computing system 880 may automatically set one or more alarms and/or one or more shutdown values, which may help to prevent incidents related to exceeding maximum safe pull, etc.

As an example, the computing system 880 may optionally, in addition to setting one or more alarms to prevent exceeding high tension limit(s), be implemented to automatically set one or more low tension alarms, for example, on one or more predicted tensions while a tool is moving into a borehole and tension(s) is/are low. For example, if measured tension decreases below a predicted tension, the computing system 880 can include one or more instructions that when executed infer that the tool has stopped moving (e.g., to some amount of certainty, probability, etc.).

As an example, a GUI may render probability of stopping information to a display. For example, a GUI such as the GUI 900 of FIG. 9 may be rendered along with a probability graphic for probability of stopping. In such an example, the probability of stopping may be based at least in part on information such as borehole trajectory information, fluid information, speed of movement, mass, etc. In such an example, while limits as values may appear, the probability of stopping provides additional information for a user to consider. In such an example, a user/operator may be notified to pay closer attention to a conveyance or retrieval operation when a probability of stopping increases.

As an example, the computing system 880 may provide for relatively safe and efficient winch automation where it allows for linking a planning framework with real-time winch acquisition control (e.g., a winch acquisition and control framework).

Figure 12:
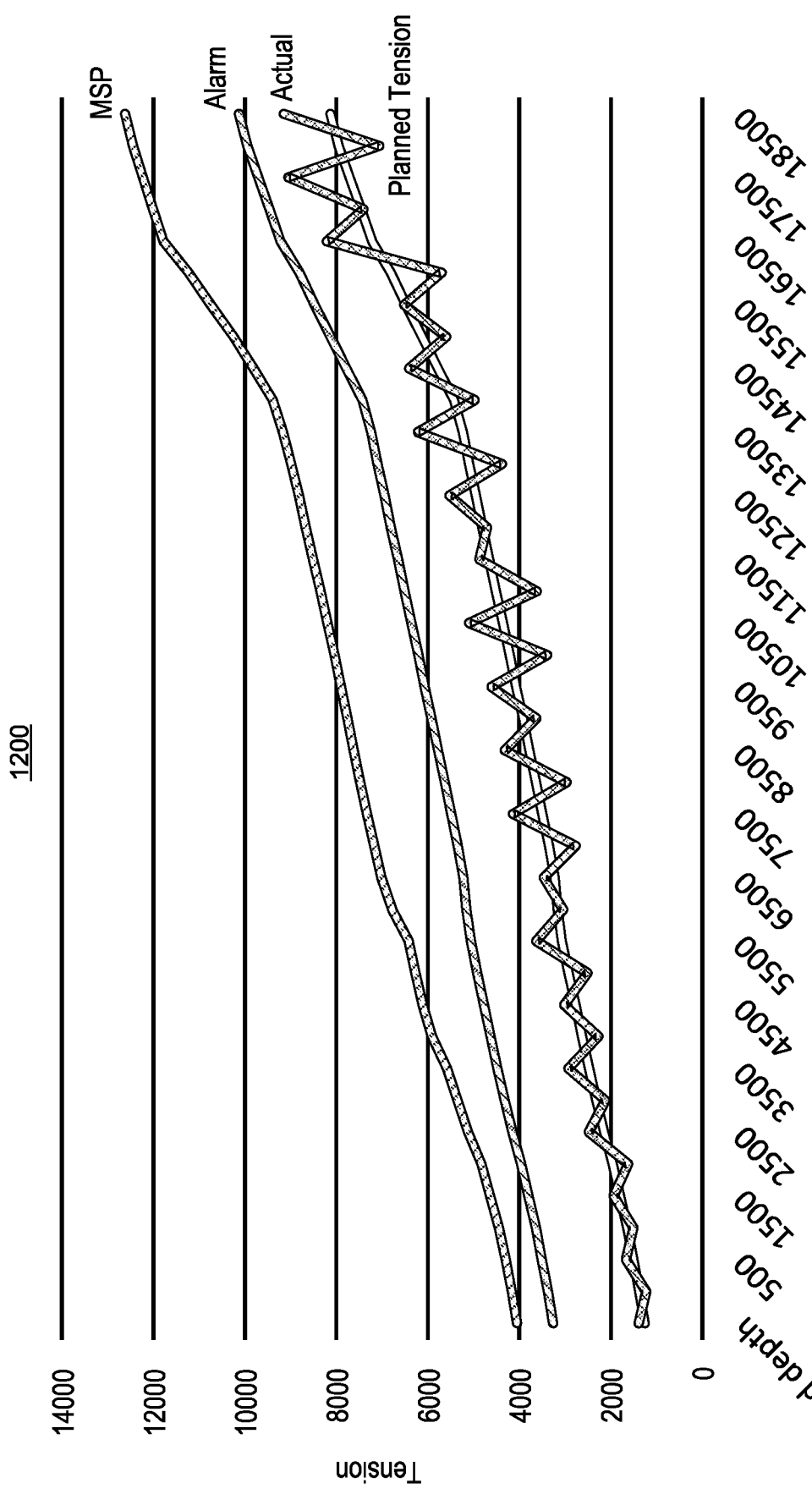
FIG. 12 illustrates an example of a plot.

FIG. 12 shows an example plot 1200 of tensions versus measured depth as to a tool in a borehole (e.g., a tool being conveyed in a borehole, etc.). As shown, planned tension is in a solid white fill line and actual tension is in a cross-hatched fill line. Alarm values, in a single hatch fill line, in terms of tension are shown as being at values above those of the planned values and MSP values, in an opposing direction single hatch fill line, are shown as being at values above those of the alarm values. Such a plot can be generated by a computing system such as the computing system 880 of FIG. 8 where the actual values are acquired via one or more sensors and fed into the computing system 880 to make model-based adjustments, for example, to planned values. In such an approach, alarm value(s) and/or MSP value(s) may be computed and set for purposes of controlling conveyance and/or retrieval of equipment with respect to a borehole in a formation. As mentioned, conveyance may be via a cable, noting that in some examples, a drillpipe may be considered to be a type of cable when the drillpipe carries a tool or tools and a coiled tubing may be considered to be a type of cable when the coiled tubing carries a tool or tools. In such examples, information as in the plot 1200 may be generated for drillpipe and/or for coiled tubing.

Figure 13:
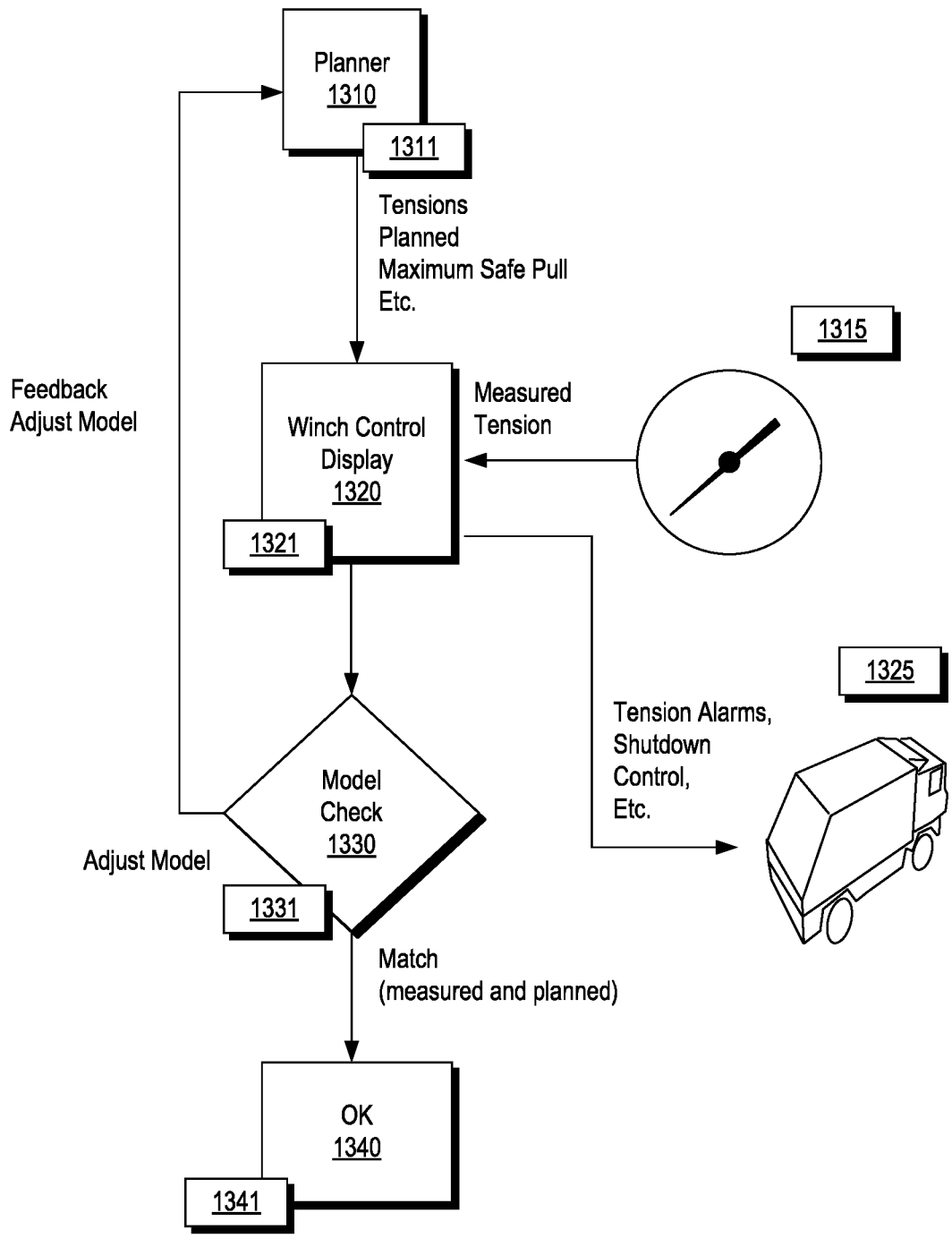
FIG. 13 illustrates an example of a method.

FIG. 13 shows an example of a method 1300 that includes a planner block 1310, a winch control display block 1320, a model check decision block 1330 and an OK block 1340. In such an example, the model check decision block 1330 can provide for deciding whether a match exists between actual, measured tension and planned (e.g., predicted/estimated) tension. Where a match exists, the method 1300 can continue to the OK block 1340, which may cause the method to continue to the block 1320 or to another block. Where a match does not exist (e.g., within some acceptable amount of error, etc.), the method 1300 can continue to the planner block 1310, for example, to adjust one or more aspects of a model or models of the planner block 1310 (e.g., a planner framework, etc.).

As shown in the example of FIG. 13, the method 1300 can include receiving information, directly and/or indirectly, from one or more sensors 1315 (e.g., gauges, etc.) and can include transmitting information to equipment 1325 (e.g., winch control equipment, etc.).

The method 1300 is shown in FIG. 13 in association with various computer-readable media (CRM) blocks 1311, 1321, 1331 and 1341. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1300. As an example, a computer-readable medium (CRM) may be a computer-readable storage medium that is non-transitory and not a carrier wave. As an example, the blocks 1311, 1321, 1331 and 1341 may be provided as one or more modules, for example, such as the one or more modules and/or instructions 1402 of the system 1400 of FIG. 14.

As an example, the method 1300 of FIG. 13 may be implemented via a system such as the system 800 of FIG. 8. As an example, the method 1300 of FIG. 13 may be implemented at least in part via a system such as the computing system 880 of FIG. 8. As an example, the computing system 880 of FIG. 8 and/or the method 1300 of FIG. 13 may be implemented as part of a system such as, for example, the system 700 of FIG. 7 (see, e.g., types of equipment, etc. per block 708, data of the block 706, planning of the block 702, etc.).

As an example, integration of planned or predicted tensions with actual winch controls measuring tension can add value to field operations and can generate information that can be analyzed as to how control, models, etc. may be improved. Such an approach can allow for a reduction in human operator error and, for example, operator associated costs. Further, such an approach can help to assess equipment and possibly extend the life of equipment (e.g., cable) as profiles as to tensions and tension ranges may be ascertained and stored to provide histories for equipment where such histories may themselves be analyzed, for example, to determine when servicing, replacement, end-of-life is to occur.

As an example, an automated system that integrates planning and actual data for control of field operations where equipment is conveyed or retrieved can increase efficiency and can reduce risk. In the process, data and behaviors may be discerned, which can be part of a continuous improvement cycle for such field operations.

As an example, a computing system can provide for reduction in nonproductive time, for example, by reducing unintentional pulloffs of a tool from a cable. For example, such a computing system may automate alarm and shutdown settings based at least in part on actual sensor data acquired during a field operation. As an example, such a computing system can improve safe winch automation operations by adding real-time feedback and predictive tension modeling.

As an example, a method can include receiving information associated with a conveyance of equipment in a borehole via a cable; determining cable tension values based at least in part on a model and at least a portion of the information; conveying the equipment in the borehole via the cable; acquiring a cable tension value via one or more sensors; comparing the acquired cable tension value to at least one of the determined cable tension values; and, based at least in part on the comparing, setting a cable tension limit for further conveying of the equipment in the borehole via the cable. In such an example, the method can include conveying at least one wireline tool via the cable. As an example, other type or types of equipment may be conveyed. For example, a method can include conveying an electric submersible pump via a cable.

As an example, conveying can include transporting equipment downhole or transporting equipment uphole. Equipment may be transported downhole in a downhole conveyance operation and then transported uphole in a retrieval operation (e.g., an uphole conveyance operation).

As an example, a cable tension limit can be a cable tension alarm limit. As an example, a cable tension limit can be a maximum safe pull limit.

As an example, a method can include rendering a graphic to a display that includes an indicator that is based at least in part on a cable tension limit.

As an example, a method can include acquiring information from a load cell sensor (e.g., or load cell sensors). As an example, a load cell sensor may be operatively coupled to a sheave.

As an example, a sheave can be a type of pulley that finds use in wellsite operation, borehole operations, etc. As an example, a sheave can be a pulley mounted on the top of a rig (e.g., crown blocks), a pulley used for running wireline tools into a bore, etc. In the case of the crown blocks, a drilling line, a heavy wire rope, may be threaded between the crown blocks and the traveling blocks in a block and tackle arrangement to gain mechanical advantage. As an example, a relatively weak drilling line (e.g., a breaking strength of perhaps about 100,000 pounds (45,400 kg)), may be used to lift larger loads (e.g., in excess of one million pounds (454,000 kg)). During wireline operations, two sheaves may be utilized and hung in a derrick where wireline is run from a logging unit (e.g., a truck, etc.) through the sheaves and then down to a logging tool in a bore.

As an example, a model can include model parameters and a method can include adjusting at least one model parameter value responsive to comparing values where the comparing compares a difference in values to an error limit.

As an example, a method can include receiving identification information for at least one of one or more sensors. In such an example, a method can include adjusting at least one parameter value of a model based at least in part on the identification information. As an example, a method can include issuing an alarm where a sensor does not match a sensor specified in a model.

As an example, a release device may be operatively coupled to equipment and to a cable. Such a device may be rated and may include a memory where the memory is readable to identify the device and, for example, its rating. As an example, consider an RFID chip that is in or otherwise attached to a release device where the RFID chip may be interrogated by an RFID reader to determine the type of device and, for example, one or more other characteristics (e.g., rating, prior use(s), etc.).

As an example, a method can include controlling a winch where conveying of equipment via a cable occurs via operation of the winch. In such an example, controlling can control the winch to avoid generation of cable tension in excess of a cable tension limit (e.g., as may be determined via a method such as the method 1300 of FIG. 13, the computing system 880 of FIG. 8, etc.). As an example, a method can include controlling operation of a winch where such controlling depends at least in part on acquiring cable tension values and, for example, comparing such values to model-based values.

Figure 14:
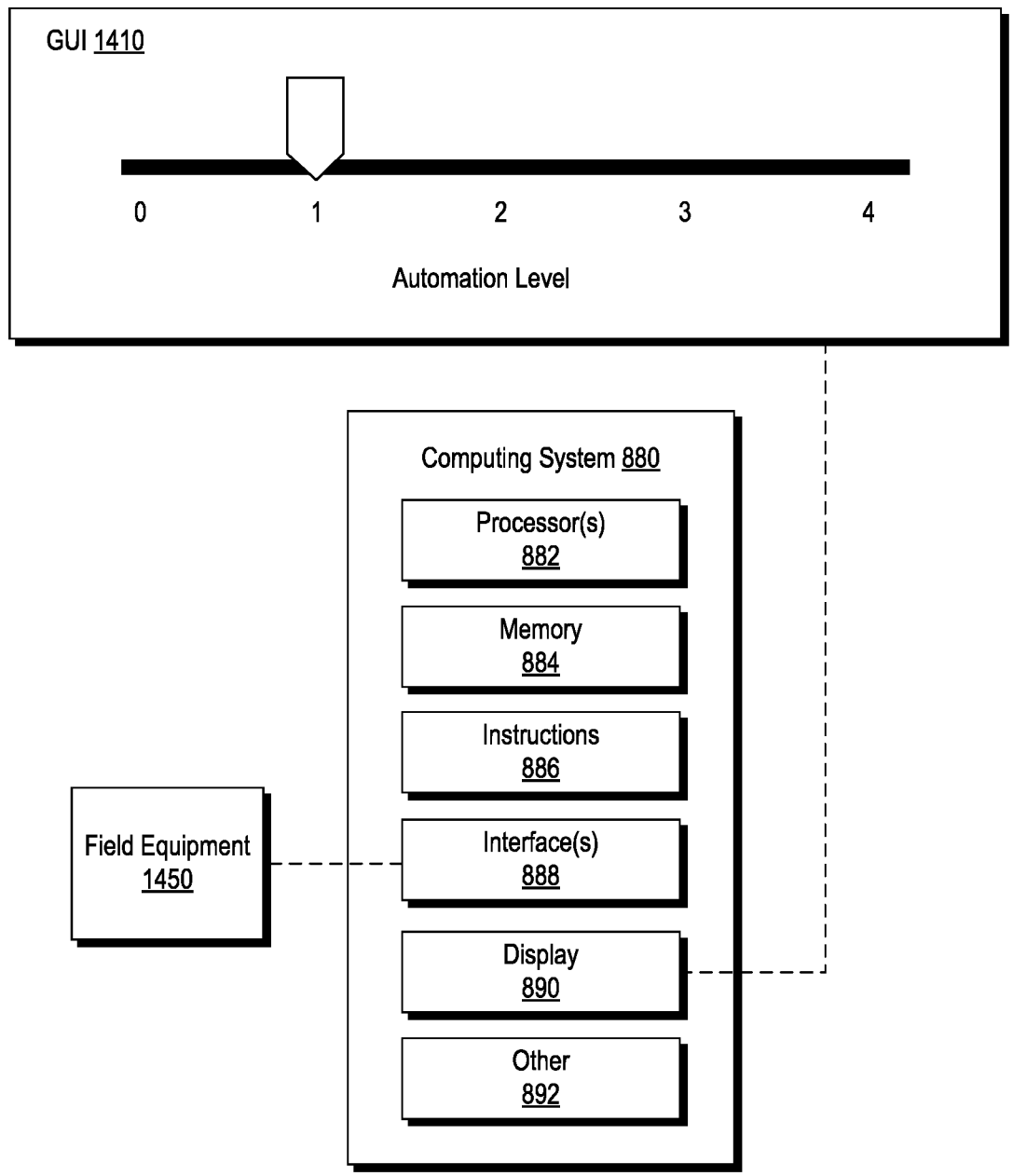
FIG. 14 illustrates an example of a graphical user interface along with the computing system of FIG. 8.

FIG. 14 shows an example of a system 1400 that includes a graphical user interface (GUI) 1410, the computing system 880 of FIG. 8 and field equipment 1450. In the example of FIG. 14, the GUI 1410 includes a graphical control that can be utilized to select an automation level. As an example, the number of automation levels can be two or more. In the example of FIG. 14, the number of automation levels is shown to be five, labeled 0, 1, 2, 3 and 4, where a higher number corresponds to a higher level of automation.

As to the scheme of the GUI 1410: consider automation level 0 as instructing the system 1400 to operate in a manner where a user has control and makes decisions; consider automation level 1 as instructing the system 1400 to operate in a manner where a user controls functions and can sets tension/depth shutdown alarms which can cause a winch to stops (e.g., via issuance of an instruction or instructions from the interface(s) 888 to one or more pieces of the field equipment 1450); consider automation level 2 as instructing the system 1400 to operate in a manner where the system 1400 monitors one or more particular functions and adjusts one or more of settings, auto speed and auto alarms as associated with deployment and/or retrieval of one or more pieces of the field equipment 1450 and where a user controls one or more other functions; consider automation level 3 as instructing the system 1400 to operate in a manner where a user can turn over operation for one or more workflows to the system 1400 and where the user can be available to address one or more unforeseeable conditions (e.g., auto RIH, tie in, log where one or more events such as stuck or apply power to perforate are under user control); and consider automation level 4 as instructing the system 1400 to operate in a manner where user intervention is optional (e.g., a fully automated mode of operation).

As an example, an operational mode may provide for automating winch movement to run in and/or out of the hole in an autonomous manner. Such an operational mode may include a detection feature that may utilize a tension plan (see, e.g., the plots of FIGS. 11 and 12) to provide for detecting when the plan is not being followed and, for example, to detect movement anomalies of equipment being conveyed. For example, when a tool being conveyed no longer falls by gravity, or the tool has stopped on some obstruction in the well, one or more measurements may be utilized for comparison to a tension plan to detect such an occurrence or occurrences as one or more movement anomalies. As an example, coming out of a borehole and/or going into a borehole, a system may implement "stuck" logic to detect and/or to reduce risk of sticking of equipment conveyance.

As an example, the computing system 880 can receive input via the GUI 1410 responsive to touch, voice, or other manner of input. In response, the computing system 880 can select an operational mode that corresponds to the input automation level. For example, the computing system 880 can include various instructions 886 executable by one or more of the processors 882 to cause the computing system 880 to interact with one or more pieces of the field equipment 1450 with and/or without intervention that may occur via one or more user input instructions, commands, etc.

As an example, a workflow or workflows may be performed using one or more automation levels. For example, in a phase or stage that is considered low risk as to issues, a higher automation level may be implemented; whereas, where issues may be expected, a lower automation level may be implemented where, for example, information is received from one or more pieces of field equipment and analyzed to provide guidance to an operator. In such an example, a feedback loop can exist that can optionally include a computation delay whereby user input is analyzed to determine whether such input may cause a violation of one or more settings (e.g., alarm settings, etc.) prior to implementation or, for example, a system may operate in a user trust mode where use input is considered to be trusted and implemented without such a computation delay as to a violation or violations. As an example, during a workflow, a system may optionally relinquish control (e.g., automated control, etc.) to a user (e.g., user input) such that the system does not interfere with the user; noting that the system may, in such an operational mode, provide information (e.g., as received from field equipment and rendered to one or more displays, etc.).

As an example, a manual control scenario that is aided by a system such as the computing system 880 of FIG. 8, etc., may include allowing for manual control of winch joystick operations, spooling arm operations and alarm and/or shutdown limits. In such an example, a user may interact with a system to generate user input upon which the system relay to one or more pieces of equipment one or more of direction, speed, smart stop, cable speed to rotational speed, torque and tension limits, spooling arm position and force, hardware metrics (fuel, pressure, . . . ), etc. In such an example, the system may receive information from one or more pieces of equipment and render information based at least in part thereon to a display or displays.

As another example of a manual control scenario, consider pressure control with actuator control and sensor display. In such an example, user input may provide for control of rams (e.g., open/close), pack off (e.g., change pressure), tool trap and head catcher operations (e.g., activate/deactivate/position), PTU pump operations (e.g., fill/drain at rate, etc.), leak detection, one or more pressures, etc.

As an example of a workflow that may include mechanization implemented at least in part via a system. For example, consider one or more operational sequences associated with one or more of a pressure test, a run-in-hole (RIH), a pull-out-of-hole (POOH), a smart stop, speed control per standard work instruction (SWI), auto tension alarm adjustment, pre-programmed operations for a function or functions (e.g., jarring, etc.), one or more constant speed log passes, etc.

As an example of a workflow may include orchestration (e.g., a high level of automation) implemented at least in part via a system. For example, consider a digital plan driven workflow where the system receives or generates a digital plan that can instruct the system to operate in an orchestrated manner with respect to one or more pieces of field equipment. As an example, a system may operate to execute one or more orchestrated sequences (e.g., sequences of tasks, etc.), to make one or more planning decisions and/or re-planning decisions (e.g., tension based, with winch coordination, with winch and pressure control equipment (PCE) coordination, etc.), to perform in coordination with one or more acquisition routines for purposes of performing one or more services associated with one or more pieces of field equipment (e.g., perforation, production logging (PL), tractor, etc.), to perform one or more operator-based decisions (e.g., depth set, shooting, etc.).

Figure 15:
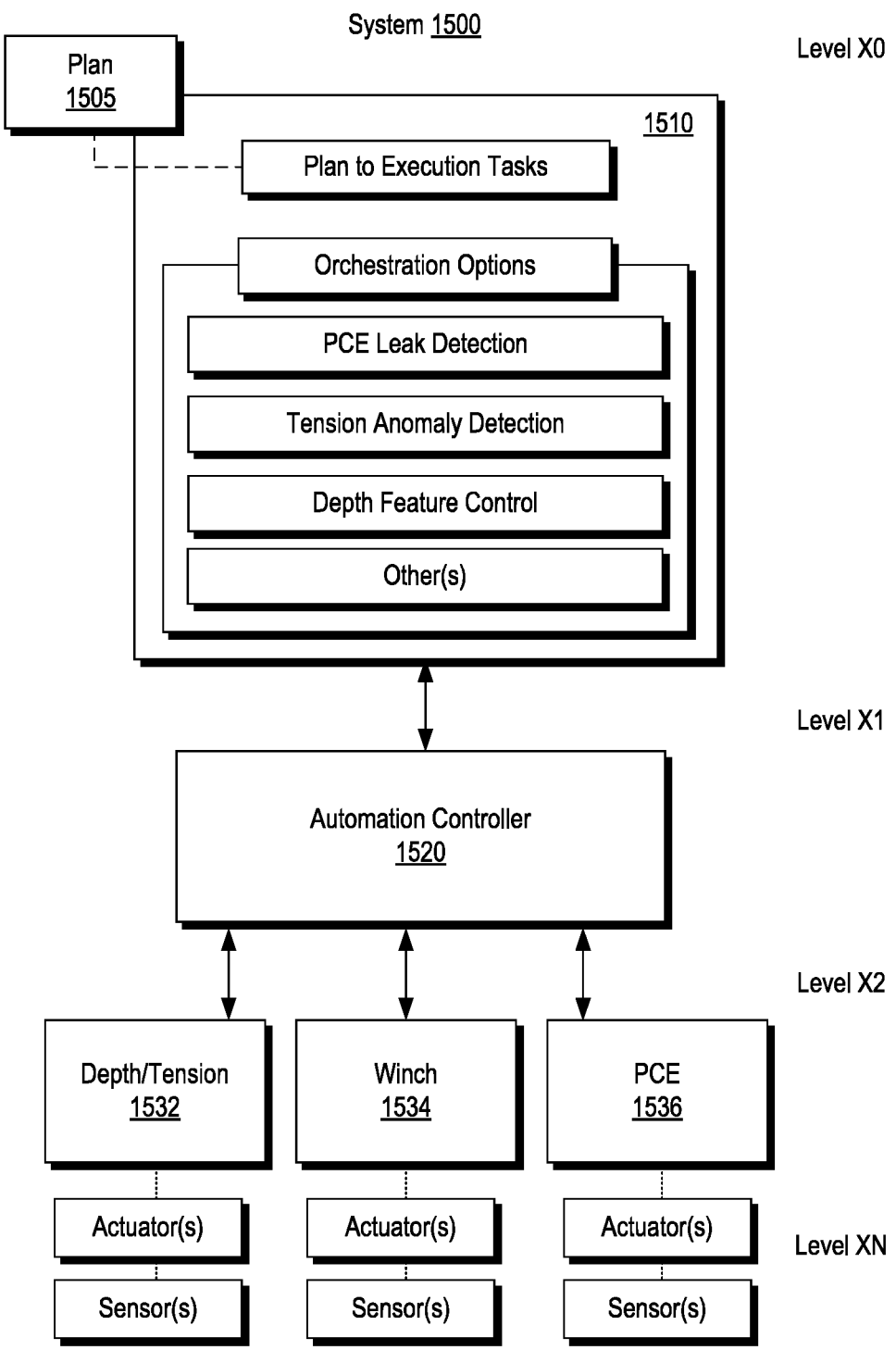
FIG. 15 illustrates an example of a system.

FIG. 15 shows an example of a system 1500 that can be organized according to a system architecture, which may include various levels such as the level X0, the level X1 and the level X2, which may correspond to high level control, low level control and equipment level control, respectively.

In the example of FIG. 15, the system 1500 includes an orchestration engine 1510 that can be a computerized portion of the system 1500 that includes one or more processors, memory and one or more interfaces. As shown, the engine 1510 can receive a plan 1505, which may be in digital form. The engine 1510 can, based at least in part on the plan 1505, determine various execution tasks that can be executable at least in part via the engine 1510.

As an example, the engine 1510 can include various options as to orchestration of tasks. For example, consider a pressure control equipment leak detection option, a tension anomaly detection option, a depth feature control option and/or one or more other options.

In the example of FIG. 15, the engine 1510 can transmit and/or receive information from an automation controller 1520, which can be at a lower level of control than the engine 1510. As shown, the automation controller 1520 can be operatively coupled to one or more pieces of equipment at yet a lower level of control where such a level can include, for example, depth and/or tension equipment 1532, winch equipment 1534 and/or pressure control equipment (PCE) 1536. In such examples, one or more actuators and/or one or more sensors may be provided in an environment where one or more tasks are to be performed. As an example, an enhanced Wireline Acquisition Front-End (eWAFE) depth/tension alarm may be implemented that can control operation of a winch or other equipment. For example, where an alarm limit is reached, a command may be issued that causes a winch to stop.

As an example, the eWAFE may be implemented as part of a unit or as part of a system. For example, an offshore unit (OSU) may be suitable for pulling a ten thousand pounds force or more with a drum capacity of ten thousand feet of cable. Such an OSU may be implemented with (e.g., interfaced with) a capstan, for example, with high strength cables (e.g., "ultrastrength" cable, etc.). As an example, an eWAFE may provide data acquisition capabilities for one or more pieces of equipment, one or more processes, one or more environmental factors, etc.

As an example, a unit may be diesel powered and/or electro-hydraulically powered. As an example, control of a unit may be via hydraulics and/or one or more other control mechanisms.

As to accessories, which may be conveyance accessories, such equipment can include a tri-roller, an offset tri-roller, a dual-wheel roller, a roller bottom nose, etc. As an example, an accessory may help to reduce friction by enabling rolling rather than sliding. As an example, a workflow may aim to reduce risk of sticking where such a workflow may take into account equipment such as one or more accessories that can physically help to reduce risk of sticking. In such an example, an operation or operations may be controlled in a manner that aims to reduce risk of sticking that may depend on one or more physical pieces of equipment (e.g., and function(s) thereof) that may be positioned downhole. As an example, an operation or operations that aim to reduce risk of sticking can include a tripping in operation and/or a tripping out operation. Some additional examples of accessories as equipment include a large diameter bottom nose, a low contact area standoff, a tool turner, a low-friction standoff, an inline roller, etc.

As an example, a cable release device may be utilized as a piece of equipment, which may be controllable. For example, consider an electronically controlled cable release device, which may be suitable for wireline openhole operation and cased hole operation. As an example, cable release may be triggered in response to one or more types of downhole conditions that may be encountered during an operation or operations. As an example, an electrical signal may be transmitted via one or more conductors to a cable release that causes the cable release to actuate a release mechanism for a cable.

As an example, a planner may be utilized as a computerized framework that can generate a plan such as a well conveyance plan. As an example, a planner may account for physical equipment specifications and/or physical conditions that may be encountered during execution of a conveyance plan. As an example, a planner may identify one or more "weak" links in a string of equipment to be conveyed. Information such as bore geometry, mud, temperature, pressure, etc., may be utilized by a planner. As an example, a planner can include instructions executable by one or more processors to analyze information and to output information such as equipment and/or operational specifications. As an example, a planner may output pulling capabilities of a conveyance package. As an example, a planner may output tension and drum information. As an example, a fishing analysis (e.g., as to fishing out equipment) may be performed to estimate fishing risk and/or associated fishing non-productive time (NPT). As an example, a planner (e.g., and/or other framework) may provide information in a digital form as to well profile, surface tension, drum force, wireline setup and relative operational risk.

As mentioned, the system 1500 of FIG. 15 can be organized with respect to levels. As to winch operations, consider level X0 including factors such as: RIH (run-in-hole) to X depth, tie in pass interval, auto-correlate depth shift, run service (e.g., position to perforation depth, run production logging (PL) passes, etc.), and POOH (pull-out-of-hole).

As to winch operations, consider level X1 including factors such as: monitor tension, auto adjust alarms, increase down speed to Y (e.g., following a standard work instruction (SWI)), monitor depth to next speed change (e.g., restrictions, etc.), change speed (e.g., slow down at restriction), change speed back to SWI (e.g., passed restriction), rate change to safe stop at X depth, increase speed for up correlate, constant speed for correlate, depth shift, increase down speed, etc.

As to winch operations, consider level X2 including factors such as: TLS limit, change speed at rate, run at speed, eStop, spooling arm force, auto-speed (with depth input), etc.

As to winch operations, consider level X3 including factors such as: set speed, set speed change rate, etc., rotation torque control, eStop, stop winch, set brakes.

As to PCE operations, consider level X0 including factors such as: pressure test (no perforation) and pressure test (w/perforation).

As to PCE operations, consider level X1 including factors such as: pressure test (no perforation), sensor check for start state, perform fill, stop at well head pressure (WHP) (e.g., wait Y min, check leak, etc.), pressure in limit, bleed to WHP, open tool trap, head catcher, pressure test (w/perforation), etc.

As to PCE operations, consider level X2 including factors such as: packoff pressure, head catcher active/inactive, tool catcher active/inactive, blow out protector (BOP) ram close/open/position, fill pump on/off/rate, etc.

As to PCE operations, consider level X3 including factors such as: close, eStop, stop winch, set brakes.

In the example of FIG. 15, the depth and/or tension equipment 1532, the winch equipment 1534 and/or the pressure control equipment (PCE) 1536 may be at a programmable logic controller (PLC) level of control. As an example, a PLC can be an industrial computer control system that monitors the state of input devices and makes decisions based upon a control instructions (e.g., one or more control programs, etc.) to control the state of output devices.

As an example, a method can include conveying at least one production logging (PL) tool. For example, consider a method that includes conveying one or more wireline tools used to measure flow characteristics of a producing well or an injector well. In such an example, a measurement may be one of a flow rate measurement, a pressure measurement, or a temperature measurement. As an example, a model that can model tension in a cable may account for one or more of flow rate, pressure or temperature. In such an example, a flow rate that is counter to a cable coupled tool may experience lift and a flow rate that is aligned with a cable coupled tool may experience drag. As an example, friction between a cable coupled tool and/or a cable may depend on one or more characteristics of fluid that is in contact with the cable coupled tool and/or the cable. As an example, a model may account for fluid with respect to one or more of lift, drag and friction, which may be fluid friction and/or friction associated with a formation that defines a borehole (e.g., consider fluid lubrication that can reduce friction between equipment and a formation).

As an example, a system can include perforation equipment. As an example, a system can be or include a wireline perforating platform (WPP). As an example, consider a WPP that includes a set of tools for perforating and monitoring pressure during a perforating operation. A perforation operation can include perforation of tubing (e.g., a tubing wall) and/or a formation. A perforation can be utilized to couple two regions such that the two regions are in fluid communication (e.g., for flow of fluid in one or more directions from one region to the other).

As an example, a system can include pressure control equipment (PCE), which can include surface pressure control equipment. As an example, PCE can include a wellhead connector, a manifold, etc. As an example, PCE can be operable to contain wellbore pressure and/or to divert formation fluid (e.g., liquid and/or gas). As an example, an operation may utilize PCE with a focus on maximizing safety of one or more operations. As an example, PCE can include a large-bore drilling BOP, which may be suitable for deepwater drilling. As an example, PCE can include one or more rams that can shear hardbanding on tool joints, etc.

Figure 16:
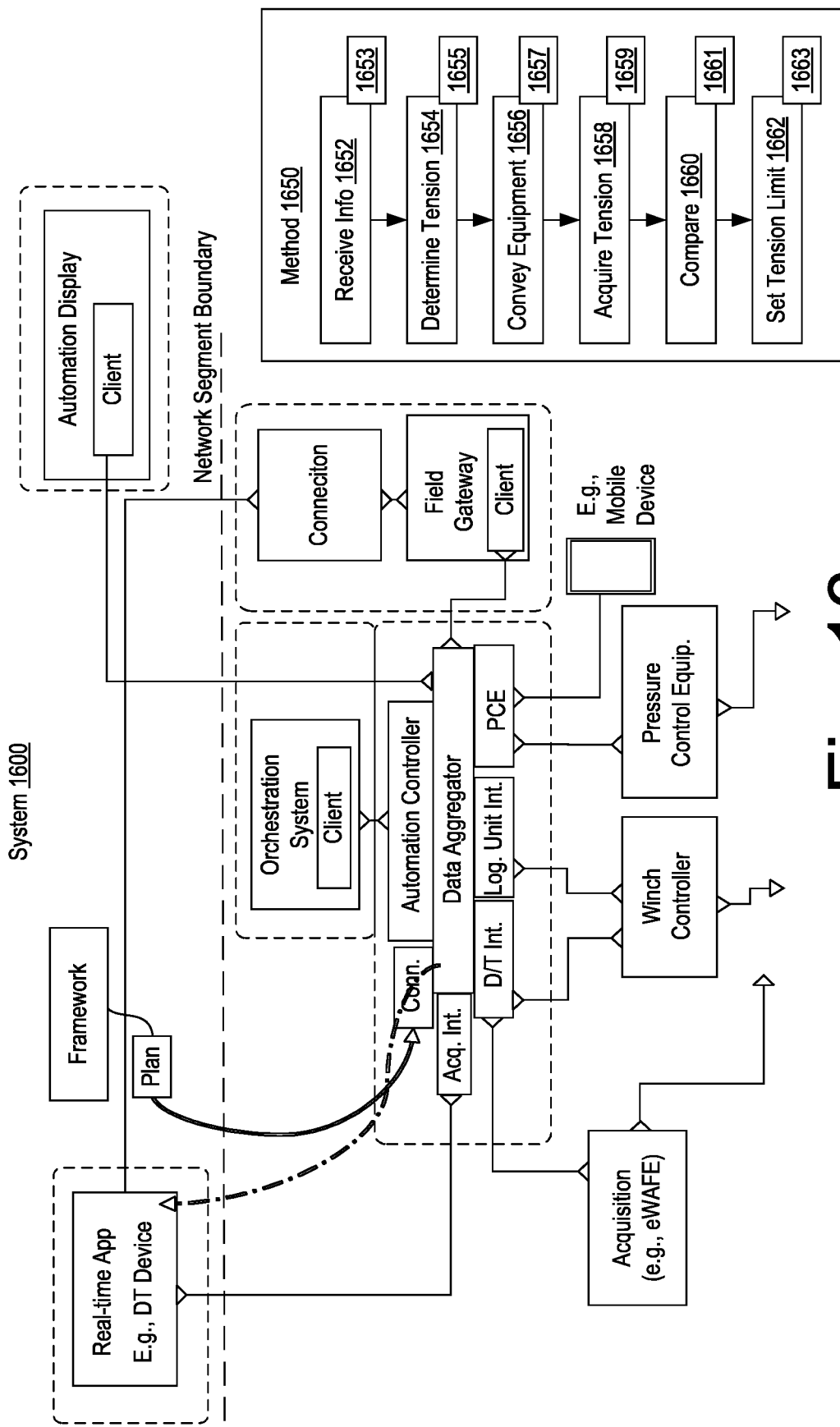
FIG. 16 illustrates an example of a system that can include components of the system of FIG. 15 and an example of a method.

FIG. 16 shows an example of a system 1600 that includes various components, some of which are shown in the system 1500 of FIG. 15, along with an example of a method 1650. In the example of FIG. 16, the system 1600 can receive a plan, which may be generated by one or more frameworks. As shown, an orchestration system can interact with an automation controller, which can interact with components for depth tension, winch control, pressure control equipment, etc. (see, e.g., the components 1532, 1534 and 1536 of FIG. 15).

As an example, a mobile device can include an interface such as a wireless interface, which may access one or more components of the system 1600, for example, to access information about one or more operations, about one or more pieces of equipment, about one or more conditions, etc. As an example, the mobile device can include a GUI that allows for transmission of information to one or more components of the system 1600. As an example, a mobile device may be a tablet, a smartphone, etc. and utilized, for example, at a site such as a rig site.

As shown in FIG. 16, one or more components of the system 1600 can include network interfaces and may be implemented in a client-server manner where, for example, a client may be accessible within a network boundary associated with a site and/or accessible outside of such a network boundary.

In the example of FIG. 16, an acquisition component (e.g., eWAFE, etc.) may be utilized for acquisition and transmission of information such as, for example, information about one or more pieces of equipment.

As an example, the system 1600 of FIG. 16 may be utilized to implement a method that includes receiving logging objectives (e.g., as to one or more zones, one or more intervals, etc.) and a well schematic (e.g., borehole geometry, deviation, tubing, casing, downhole hardware, etc.). In such an example, the method may determine equipment that can be utilized to meet one or more of the logging objectives (e.g., units, tools, cable, etc.) and may determine one or more well properties based at least in part on the well schematic (e.g., pressure, flow, etc.). In such an example, the method can include generating an execution plan based at least in part on a tension model where the tension model can model tension in a cable associated with conveyance of equipment. Such an execution plan may be received by a system for purposes of implementation and/or revision of the plan, which may optionally occur in real-time based at least in part on information received during implementation as may be sensed by one or more sensors.

As an example, one or more decisions may be made during execution of a plan where a decision may decide to re-plan (e.g., revise at least one portion of an execution plan, etc.). In such an example, equipment being conveyed and/or conveyance equipment may be operated in a manner that aims to reduce damage to equipment, reduce damage to a formation (e.g., borehole wall), reduce non-productive downtime (NPT), reduce resource utilization (e.g., power, specialized fluid, etc.), reduce risk to an operator or operators, etc.

Conveyance and conveyance tension can depend on one or more of various factors, including, for example, type of well, which may be specified by a well schematic (e.g., a digital well schematic file, etc.). Concerns may arise during conveyance such as, for example, one or more of high tension, tool sticking, high temperatures, and power and/or telemetry demands of a long, heavy toolstring that is being conveyed. Such concerns may be more prominent in longer and/or deeper wells (e.g., consider deepsea, etc.). As an example, a cable may be selected from one or more types of cables. As an example, a cable may be a TUFFLINE™ cable (Schlumberger Limited, Houston, Tex.) or another type of cable. A cable may be a composite cable that can include integrated polymer-locked armors.

As an example, a cable may be utilized to convey one or more types of equipment. For example, a cable may convey one or more wireline tools and/or one or more pumping tools (e.g., an electric submersible pump, etc.). As an example, a cable may be utilized to convey one or more pieces of equipment that include memory that is suitable for storage of commands, sensed information, etc. As an example, a cable may include one or more optical fibers and/or optical fiber links that can be disposed in a well (e.g., optionally through a drill pipe, etc.).

As an example, a system may be utilized for conveyance of one or more types of equipment. As an example, a system may be configured to retrieve, install, actuate, etc., one or more tools with a slickline and/or with coiled tubing. As an example, a system may be configured to recover equipment when drill pipe is tripped out (POOH).

As an example, a drillpipe can function as a type of cable and/or coiled tubing can function as a type of cable. In such examples, a model may model tension associated with drillpipe and/or coiled tubing. As an example, such a model may be utilized for control of conveyance of one or more tools via drillpipe or coiled tubing where tension information is available. In such an example, a drillpipe may be considered to be a type of cable and a coiled tubing may be considered to be a type of cable.

As shown in FIG. 16, the method 1650 can include a reception block 1652 for receiving information associated with a conveyance of equipment in a borehole via a cable; a determination block 1654 for determining cable tension values based at least in part on a model and at least a portion of the information; a conveyance block 1656 for conveying the equipment in the borehole via the cable; an acquisition block 1658 for acquiring a cable tension value via one or more sensors; a comparison block 1660 for comparing the acquired cable tension value to at least one of the determined cable tension values; and a set block 1662 for, based at least in part on the comparing, setting a cable tension limit for further conveying of the equipment in the borehole via the cable.

As an example, the system 1600 may be utilized to implement the method 1650 and/or the computing system 880 of FIG. 8 may be utilized to implement such a method. As an example, the method 1650 may be implemented in a mode that corresponds to an automation level, for example, as in the example system 1400 of FIG. 14. While the method 1650 pertains to tension (e.g., as may be associated with winch operation), one or more methods may pertain to pressure control equipment (PCE), optionally in addition to tension. As an example, one or more features of a system may be orchestrated via an orchestration engine (see, e.g., the engine 1510 of FIG. 15) where an automation controller can interact with one or more programmable logic controller (PLC) such as explained with respect to the blocks 1532, 1534 and 1536 of the system 1500 of FIG. 15. As mentioned, one or more actuators and/or one or more sensors may be part of a system (see, e.g., the system 1500 of FIG. 15). In the example of FIG. 16, the system 1600 can be operatively coupled to one or more actuators and/or one or more sensors.

In the example of FIG. 16, the method 1650 can include processor-executable instructions stored in memory and executable by at least one processor to instruct a system to: receive information associated with a conveyance of equipment in a borehole via a cable (see, e.g., instruction block 1653); determine cable tension values based at least in part on a model and at least a portion of the information (see, e.g., instruction block 1655); convey the equipment in the borehole via the cable (see, e.g., instruction block 1657); acquire a cable tension value via one or more sensors (see, e.g., instruction block 1659); compare the acquired cable tension value to at least one of the determined cable tension values (see, e.g., instruction block 1661); and, based at least in part on a comparison of the acquired cable tension value to at least one of the determined cable tension values, set a cable tension limit for further conveyance of the equipment in the borehole via the cable (see, e.g., instruction block 1663). In such an example, the blocks 1653, 1655, 1657, 1659, 1661 and 1663 may be one or more computer-readable storage media that include computer-executable instructions.

As an example, a system can include one or more processors; a network interface operatively coupled to the one or more processors; memory operatively coupled to the one or more processors; and processor-executable instructions stored in the memory and executable by at least one of the one or more processors to instruct the system to: receive information associated with a conveyance of equipment in a borehole via a cable; determine cable tension values based at least in part on a model and at least a portion of the information; convey the equipment in the borehole via the cable; acquire a cable tension value via one or more sensors; compare the acquired cable tension value to at least one of the determined cable tension values; and, based at least in part on a comparison of the acquired cable tension value to at least one of the determined cable tension values, set a cable tension limit for further conveyance of the equipment in the borehole via the cable.

As an example, one or more computer-readable storage media can include computer-executable instructions executable to instruct a computing system to: receive information associated with a conveyance of equipment in a borehole via a cable; determine cable tension values based at least in part on a model and at least a portion of the information; convey the equipment in the borehole via the cable; acquire a cable tension value via one or more sensors; compare the acquired cable tension value to at least one of the determined cable tension values; and, based at least in part on a comparison of the acquired cable tension value to at least one of the determined cable tension values, set a cable tension limit for further conveyance of the equipment in the borehole via the cable.

Figure 17:
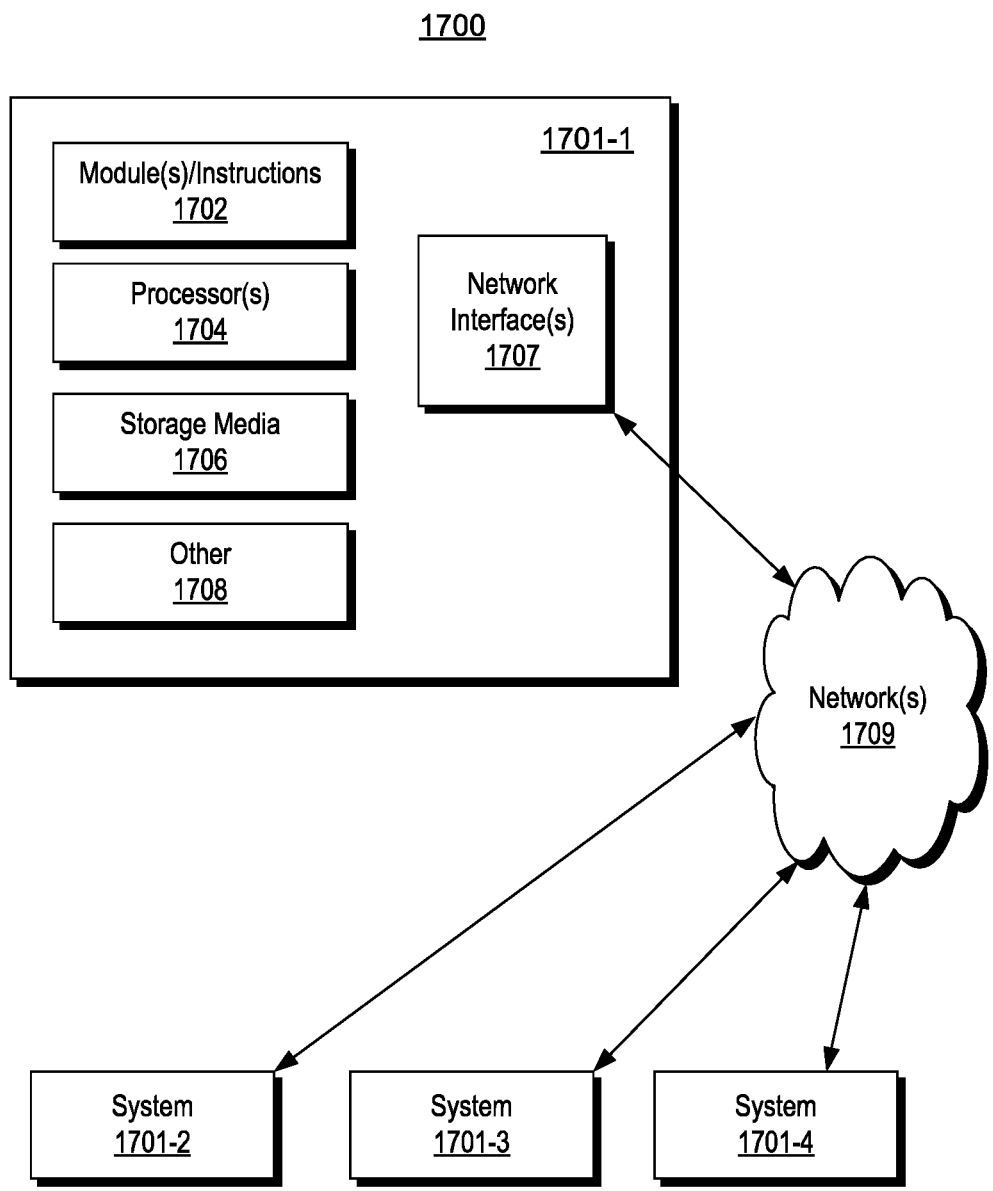
FIG. 17 illustrates examples of computing and networking equipment.

In some embodiments, a method or methods may be executed by a computing system. FIG. 17 shows an example of a system 1700 that can include one or more computing systems 1701-1, 1701-2, 1701-3 and 1701-4, which may be operatively coupled via one or more networks 1709, which may include wired and/or wireless networks.

As an example, a system can include an individual computer system or an arrangement of distributed computer systems. In the example of FIG. 17, the computer system 1701-1 can include one or more modules 1702, which may be or include processor-executable instructions, for example, executable to perform various tasks (e.g., receiving information, requesting information, processing information, simulation, outputting information, etc.).

As an example, a module may be executed independently, or in coordination with, one or more processors 1704, which is (or are) operatively coupled to one or more storage media 1706 (e.g., via wire, wirelessly, etc.). As an example, one or more of the one or more processors 1704 can be operatively coupled to at least one of one or more network interface 1707. In such an example, the computer system 1701-1 can transmit and/or receive information, for example, via the one or more networks 1709 (e.g., consider one or more of the Internet, a private network, a cellular network, a satellite network, etc.).

As an example, the computer system 1701-1 may receive from and/or transmit information to one or more other devices, which may be or include, for example, one or more of the computer systems 1701-2, etc. A device may be located in a physical location that differs from that of the computer system 1701-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1706 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 18:
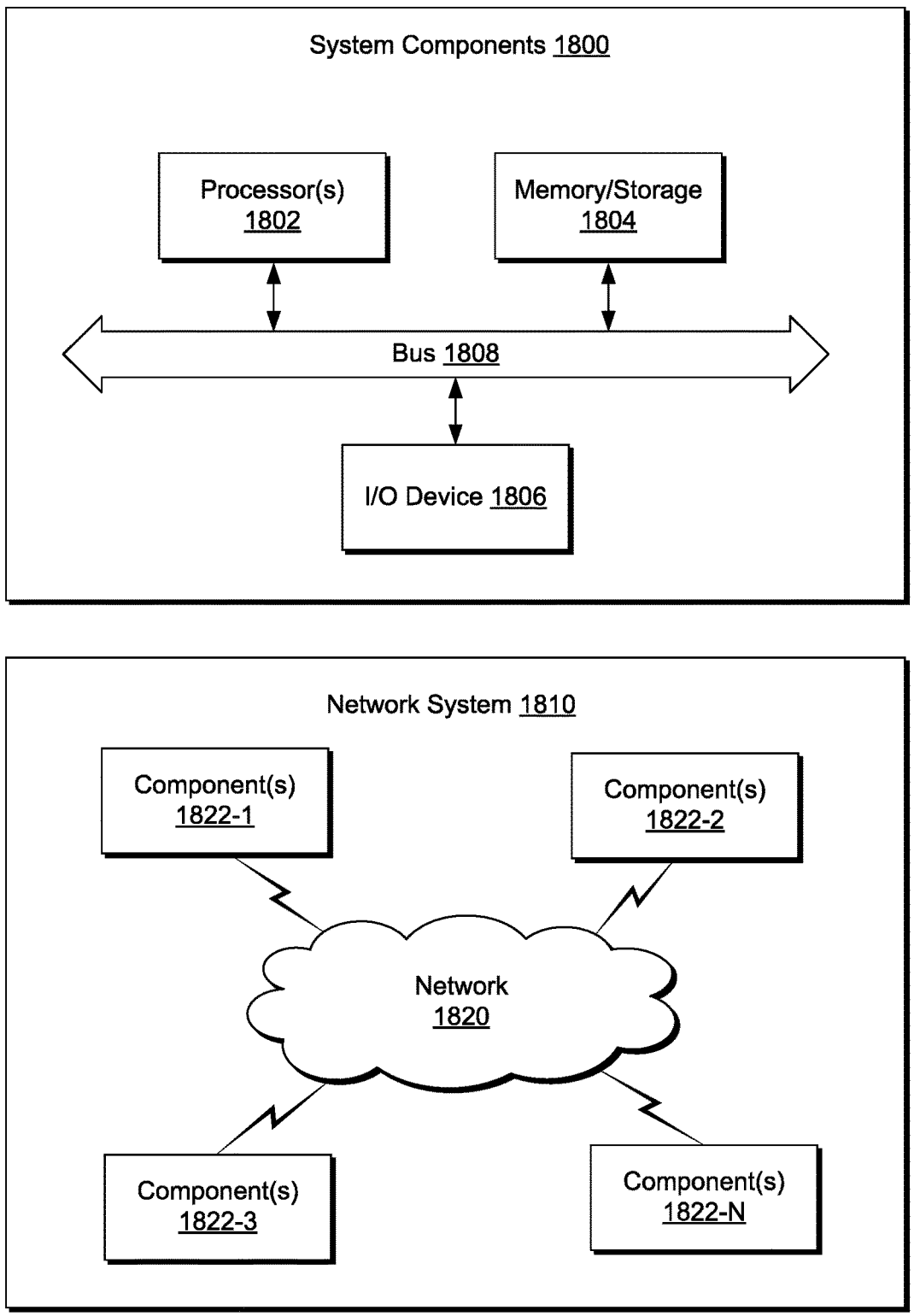
FIG. 18 illustrates example components of a system and a networked system.

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. The one or more processors may execute such instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, ... 1822-N. For example, the components 1822-1 may include the processor(s) 1802 while the component(s) 1822-3 may include memory accessible by the processor(s) 1802. Further, the component(s) 1822-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving information associated with a conveyance of equipment in a borehole via a cable;
determining cable tension values based at least in part on a model and at least a portion of the information, where the portion of the information is an input to the model;
conveying the equipment in the borehole via the cable;
acquiring a measured cable tension value via one or more sensors;
comparing the measured cable tension value to at least one of the determined cable tension values; and
based at least in part on the comparing, setting a cable tension limit for further conveying of the equipment in the borehole via the cable.

2. The method of claim 1, wherein the conveying comprises conveying at least one wireline tool via the cable.

3. The method of claim 1, wherein the conveying comprises conveying an electric submersible pump via the cable.

4. The method of claim 1, wherein the conveying comprises retrieving the equipment via the cable.

5. The method of claim 1, wherein the cable tension limit comprises a cable tension alarm limit.

6. The method of claim 1, wherein the cable tension limit comprises a maximum safe pull limit.

7. The method of claim 1, further comprising rendering a graphic to a display that comprises an indicator that is based at least in part on the cable tension limit.

8. The method of claim 1, wherein the acquiring comprises acquiring information from a load cell sensor.

9. The method of claim 8, wherein the load cell sensor is operatively coupled to a sheave.

10. The method of claim 1, wherein the model comprises model parameters and further comprising adjusting at least one model parameter value responsive to the comparing wherein the comparing compares a difference in values to an error limit.

11. The method of claim 1, further comprising receiving identification information for at least one of the one or more sensors.

12. The method of claim 11, further comprising adjusting at least one parameter value of the model based at least in part on the identification information.

13. The method of claim 1, further comprising a release device operatively coupled to the equipment and to the cable.

14. The method of claim 1, further comprising controlling a winch wherein the conveying occurs via operation of the winch.

15. The method of claim 14, wherein the controlling controls the winch to avoid generation of cable tension in excess of the cable tension limit.

16. The method of claim 15, wherein the controlling depends at least in part on acquiring measured cable tension values.

17. A system comprising:
one or more processors;
a network interface operatively coupled to the one or more processors;
memory operatively coupled to the one or more processors; and
processor-executable instructions stored in the memory and executable by at least one of the one or more processors to instruct the system to:
receive information associated with a conveyance of equipment in a borehole via a cable;
determine cable tension values based at least in part on a model and at least a portion of the information, where the portion of the information is an input to the model;
convey the equipment in the borehole via the cable;
acquire a measured cable tension value via one or more sensors;
compare the measured cable tension value to at least one of the determined cable tension values; and
based at least in part on a comparison of the measured cable tension value to at least one of the determined cable tension values, set a cable tension limit for further conveyance of the equipment in the borehole via the cable.

18. The system of claim 17 comprising a display that comprises an indicator that is based at least in part on the cable tension limit.

19. The system of claim 17 comprising a release device operatively coupled to the equipment and to the cable.

20. One or more computer-readable storage media comprising computer-executable instructions executable to instruct a computing system to:
receive information associated with a conveyance of equipment in a borehole via a cable;
determine cable tension values based at least in part on a model and at least a portion of the information, where the portion of the information is an input to the model;
convey the equipment in the borehole via the cable;
acquire a measured cable tension value via one or more sensors;
compare the measured cable tension value to at least one of the determined cable tension values; and
based at least in part on a comparison of the measured cable tension value to at least one of the determined cable tension values, set a cable tension limit for further conveyance of the equipment in the borehole via the cable.

* * * * *